United States Patent [19]

Treybig

[11] Patent Number: 5,021,471

[45] Date of Patent: Jun. 4, 1991

[54] MODIFIED EPOXY RESIN COMPOSITIONS

[75] Inventor: Duane S. Treybig, Lake Jackson, Tex.

[73] Assignee: The Dow Chemical Company, Midland, Mich.

[21] Appl. No.: 522,331

[22] Filed: May 11, 1990

[51] Int. Cl.$^5$ ............................................. C08G 59/50
[52] U.S. Cl. ................................... 523/414; 523/420; 525/504; 525/510; 528/45; 528/109; 528/118; 528/361; 528/367; 528/407
[58] Field of Search ................. 523/414, 420; 525/504, 525/510; 528/45, 109, 118, 361, 367, 407

[56] References Cited

U.S. PATENT DOCUMENTS

| | | | |
|---|---|---|---|
| 3,528,988 | 9/1970 | Uelzmann | 528/118 X |
| 3,577,426 | 5/1971 | McGill et al. | 528/118 X |
| 3,793,247 | 2/1974 | Fleming et al. | 528/118 X |
| 3,839,252 | 10/1974 | Bosso et al. | 523/414 |
| 3,962,165 | 6/1976 | Bosso et al. | 523/414 X |
| 4,007,154 | 2/1977 | Schimmel et al. | 523/435 |
| 4,066,592 | 1/1978 | Wismer et al. | 523/418 X |
| 4,069,210 | 1/1978 | Schimmel | 523/402 |
| 4,164,487 | 8/1979 | Martin | 523/403 |
| 4,191,674 | 3/1980 | Wismer et al. | 523/414 X |
| 4,383,073 | 5/1983 | Wessling et al. | 525/486 |
| 4,468,307 | 8/1984 | Wismer et al. | 523/414 X |
| 4,636,541 | 1/1987 | Stevens et al. | 523/414 X |
| 4,698,141 | 10/1987 | Anderson et al. | 523/415 X |

OTHER PUBLICATIONS

"Chemical Reactions of Poly(vinyl pyridine)s with Epoxy Compounds", by G. Xue, H. Ishida & J. L. Koenig, *Die Angewandtge Makromolekulare Chemie*, vol. 142, pp. 17–27, 1986.

*Primary Examiner*—Earl Nielsen

[57] ABSTRACT

Epoxy resins are modified by reaction with a pyridine compound and a Brönsted acid. These modified epoxy resins when cured result in products having improved properties.

30 Claims, No Drawings

MODIFIED EPOXY RESIN COMPOSITIONS

FIELD OF THE INVENTION

The present invention concerns epoxy resin compositions which have been modified with acidified pyridine compounds.

BACKGROUND OF THE INVENTION

Epoxy resins are employed in the preparation of casting, molding and coating compositions and the like, the resultant products having desirable properties. However, there is always a need for products having improved properties.

Coatings can be prepared either from waterborne or solvent-borne epoxy resin systems. However, government regulations written to reduce ozone formation encourage paint manufacturers to develop water-borne systems, especially those systems having low volatile organic content (VOC). Tropospheric ozone is formed when solvents vaporized from coating compositions during cure are mixed with nitrogen oxides in the presence of sunlight. Ozone is reported to cause pulmonary irritation on exposure, lower crop yields, retard tree growth, damage ornamental plants and shrubs, increase susceptibility to acid rain and insect damage, damage plastics, dyes and paints and lower visibility by formation of smog.

The present invention provides epoxy resins suitable for the preparation of castings, moldings, coatings and the like having an improvement in one or more of the properties selected from chemical resistance, flexibility and the like. These epoxy resins are suitable in either solvent-borne or water-borne systems or systems employing both solvents and water.

SUMMARY OF THE INVENTION

One aspect of the present invention pertains to modified epoxy resins resulting from reacting a composition comprising
(A) at least one epoxy resin selected from the group consisting of
  (1) at least one epoxy resin having an average of more than one vicinal epoxy group per molecule;
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group:
    (b) at least one compound containing a secondary amine group; or
    (c) any combination of (a) and (b): and
  (3) any combination of (1) and (2):
(B) at least one pyridine-containing compound selected from
  (1) at least one compound containing more than one pyridine group per molecule: or
  (2) a mixture of pyridine-containing compounds comprising
    (a) at least one compound containing more than one pyridine group per molecule; and
    (b) at least one compound containing only one pyridine group per molecule: and
(C) at least one Brönsted acid.

Another aspect of the present invention pertains to a curable non-aqueous composition comprising (I) a modified epoxy resin resulting from reacting a composition comprising;
  (A) at least one epoxy resin selected from the group consisting of
    (1) at least one epoxy resin having an average of more than one vicinal epoxy group per molecule:
    (2) at least one epoxy resin having an average of more than one vicinal epoxy group per molecule wherein from about 1 to about 85 percent of the vicinal epoxy groups have been reacted with
      (a) at least one compound containing an aromatic hydroxyl group:
      (b) at least one compound containing a secondary amine group; or
      (c) any combination of (a) and (b): and
    (3) any combination of (1) and (2):
  (B) at least one pyridine-containing compound;
  (C) at least one Brönsted acid; and
(II) a curing amount of at least one curing agent.

A further aspect of the present invention pertains to an aqueous composition having dissolved or dispersed in water a composition comprising
(A) at least one epoxy resin selected from the group consisting of
  (1) at least one epoxy resin having an average of more than one vicinal epoxy group per molecule;
  (2) at least one epoxy resin having an average of more than one vicinal epoxy group per molecule wherein from about 1 to about 85 percent of the vicinal epoxy groups have been reacted with
    (a) at least one compound containing an aromatic hydroxyl group:
    (b) at least one compound containing a secondary amine group; or
    (c) any combination of (a) and (b): and
  (3) any combination of (1) and (2):
(B) at least one pyridine-containing compound selected from the group consisting of
  (1) at least one compound containing more than one pyridine group per molecule: and
  (2) a mixture of pyridine-containing compounds comprising
    (a) at least one compound containing more than one pyridine group per molecule; and
    (b) at least one compound containing only one pyridine group per molecule; and
(C) at least one Brönsted acid.

A further aspect of the present invention pertains to a curable aqueous composition having dissolved or dispersed in water a composition comprising
(I) a modified epoxy resin composition resulting from reacting
  (A) at least one epoxy resin selected from the group consisting of
    (1) at least one epoxy resin having an average of more than one vicinal epoxy group per molecule;
    (2) at least one epoxy resin having an average of more than one vicinal epoxy group per molecule wherein from about 1 to about 85 percent of the vicinal epoxy groups have been reacted with
      (a) at least one compound containing an aromatic hydroxyl group;
      (b) at least one compound containing a secondary amine group: or
      (c) any combination of (a) and (b): and
    (3) any combination of (1) and (2):
  (B) at least one pyridine-containing compound selected from the group consisting of (1) at least one compound containing more than one pyridine group per molecule; and
(2) a mixture of pyridine-containing compounds comprising
    (a) at least one compound containing more than one pyridine group per molecule; and
    (b) at least one compound containing only one pyridine group per molecule;
(C) at least one Brönsted acid; and
(II) a curing amount of at least one curing agent.

A further aspect of the present invention pertains to a curable aqueous coating composition which comprises the aforementioned curable aqueous composition and one or more additives.

A further aspect of the present invention pertains to a curable non-aqueous coating composition which comprises the aforementioned curable non-aqueous composition and one or more additives.

A still further aspect of the present invention pertains to an article coated with the aforementioned curable aqueous or non-aqueous coating compositions which composition has been cured subsequent to being applied to said article.

A still further aspect of the present invention pertains to the product resulting from curing any of the aforementioned curable compositions.

DETAILED DESCRIPTION OF THE INVENTION

The modified epoxy resin compositions of the present invention are conveniently prepared as solvent-borne or water-borne systems. The solvent-borne systems are prepared by dissolving an epoxy resin in one or more suitable solvents and adding either (a) an organic solution of a mixture of a pyridine-containing compound and Brönsted acid, (b) a mixture of a pyridine-containing compound and Brönsted acid or (c) an organic solution of a pyridine-containing compound followed by later addition of the Brönsted acid. If desirable, additional quantities of organic solvent can be added during the reaction. Suitable temperatures for the reaction of the epoxy resin and either an organic solution of a mixture of a pyridine-containing compound and Brönsted acid or a mixture of a pyridine-containing compound and Brönsted acid include, for example, from about 25° C. to about 150° C., preferably from about 60° C. to about 100° C. and more preferably from about 80° C. to about 100° C. The maximum reaction temperature depends upon the boiling point of the pyridine-containing compound and the Brönsted acid chosen. Likewise, the duration or reaction time is also not critical so long as the reaction is conducted for a time sufficient to complete the reaction. Suitable reaction times include, for example, from about 1 minute to about 12 hours, preferably from about 5 minutes to about 7 hours, and more preferably from about 5 minutes to about 1 hour. Higher reaction temperatures require less time to complete the reaction whereas lower temperatures require more time to complete the reaction.

Suitable temperatures for the reaction of the epoxy resin and pyridine-containing compound followed by later addition of the Brönsted acid, include, for example, from about 25° C. to about 120° C., and preferably from about 50° C. to about 80° C. Since the pyridine-containing compound is very reactive with the epoxy resin, especially at high temperatures, the Brönsted acid should be added soon or directly after the addition of the organic solution of the pyridine-containing compound to avoid gellation. Suitable reaction times include, for example, from about 1 to about 120, preferably from about 1 to about 15 minutes. Higher reaction temperatures require less time to complete the reaction whereas lower temperatures require more time to complete the reaction.

The water-borne systems are prepared by dissolving an epoxy resin in one or more suitable solvents and adding thereto either (a) an aqueous solution or aqueous dispersion of a mixture of the pyridine-containing compound and Brönsted acid, or (b) an organic solution of the pyridine-containing compound followed by later addition of an aqueous solution of the Brönsted acid. If desirable, additional quantities of water or organic solvent can be added during the reaction. Suitable temperatures for the reaction of an aqueous solution or aqueous dispersion of a mixture of the pyridine-containing compound and Brönsted acid, include, for example, from about 25° C. to about 110° C., and preferably from about 60° C. to about 100° C. The duration or reaction time is not critical so long as the reaction is conducted for a time sufficient to complete the reaction. Suitable reaction times include, for example, from about 1 to about 48, preferably from about 5 to 24, more preferably from about 7 to about 14 hours. Higher reaction temperatures require less time to complete the reaction whereas lower temperatures require more time to complete the reaction.

Suitable temperatures for the reaction of the epoxy resin and an organic solution of the pyridine-containing compound followed by later addition of an aqueous solution of the Brönsted acid, include, for example, from about 25° C. to about 120° C., and preferably from about 50° C. to about 80° C. Since the pyridine-containing compound is very reactive with the epoxy resin, especially at high temperatures, the Brönsted acid should be added soon or directly after the addition of the organic solution of the pyridine-containing compound to avoid gellation. Suitable reaction times include, for example, from about 1 minute to about 12 hours, and preferably from about 5 minutes to about an hour. Higher reaction temperatures require less time to complete the reaction whereas lower temperatures require more time to complete the reaction.

Suitable reaction solvents which can be employed include, for example, glycol ethers, glycol esters, alcohols, ketones, combinations thereof and the like. Particularly suitable such solvents include, for example, 2-butoxyethanol, diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monoisobutyrate, n-pentyl propionate, $C_6$ to $C_{13}$ alkyl acetates, butanol, acetone, methyl ethylketone, methyl isobutyl ketone, any combination thereof and the like.

Suitable epoxy resins which can be modified with the pyridine-containing compounds include, for example, those disclosed by Patrick H. Martin in U.S. Pat. No. 4,164,487 which is incorporated herein by reference in its entirety. Also included as suitable epoxy resins are the advanced epoxy resins prepared by reacting a diglycidyl ether of either an aliphatic diol or an aromatic diol with an aromatic diol. Also suitable are the polyglycidyl ethers of phenol- or halogen or alkyl substituted phenol-aldehyde novolac resins and the polyglycidyl ethers of reaction products of cycloalkyldienes, particularly dicyclopentadiene and higher oligomers of cyclopentadiene and phenol or halogen or alkyl or oxyalkyl derivatives of phenol. Particularly suitable epoxy resins include the diglycidyl ethers of bisphenol A, bisphenol F, bisphenol K or the halogenated particularly brominated, $C_1$ to $C_4$ alkylated or $C_1$ to $C_4$ alkoxylated derivatives thereof, as well as the advanced epoxy resins prepared by reacting these diglycidyl ethers with such bisphenols as bisphenol A, bisphenol F, bisphenol K, bisphenol S or the halogenated particularly brominated, $C_1$ to $C_4$ alkylated or $C_1$ to $C_4$ alkoxylated derivatives thereof.

Most particularly suitable such epoxy resins include those represented by the following formula

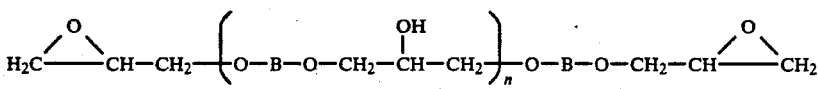

wherein each B is independently the residue remaining from the removal of the hydroxyl groups from biphenol or $C_1$ to $C_4$ alkyl or chlorine or bromine substituted biphenol or a bisphenol or $C_1$ to $C_4$ alkyl or chlorine or bromine substituted bisphenol: and n has a value from about zero to about 30, preferably from about 3 to about 20. Most particularly, B is the residue of bisphenol A, tetrabromobisphenol A, bisphenol F, tetrabromobisphenol F, bisphenol K or tetrabromobisphenol K.

Also suitable epoxy-containing compounds include any of the aforementioned epoxy resins wherein some of the epoxy groups have been reacted with a mono phenol or substituted monophenol or such epoxy resins wherein some of the epoxy groups have been reacted with a secondary amine compound.

The epoxy-containing compounds and the phenol and/or secondary amine-containing compounds are employed in amounts which provide a ratio of phenolic hydroxyl groups and/or secondary amine groups per epoxy group of from about 0.01:1 to about 0.85:1, preferably from about 0.01:1 to about 0.6:1, more preferably from about 0.1:1 to about 0.3:1.

Normally, the epoxy-containing compounds are first reacted with the phenol and/or secondary amine-containing compounds and then with the acidified pyridine compound(s). Usually, the amounts of the phenol and/or secondary amine-containing compounds employed is chosen to limit the epoxy resin content to near zero after the desired charge density is obtained by reaction of the epoxy-containing compound with the acidified pyridine compound(s).

The reaction between the epoxy-containing compounds and the phenol and/or secondary aminecontaining compounds can be conducted either in the presence or absence of any suitable solvent at any temperature sufficient to cause a reaction between the epoxy group and the phenolic hydroxyl group or secondary amine group for a time sufficient to complete the reaction. Particularly suitably temperatures for the reaction of the epoxy-containing compounds with the phenol include, for example, from about 50° C. to about 280° C., preferably from about 100° C. to about 240° C., more preferably from about 120° C. to about 220° C. and most preferably from about 120° C. to about 180° C. The higher temperatures require less reaction time than does the lower temperatures. However, suitable reaction times include, for example, from about 0.025 to about 24, preferably from about 0.05 to about 5, more preferably from about 0.1 to about 2, and most preferably from about 0.25 to about 1 hour can be employed.

Particularly suitable temperatures for the reaction between the epoxy-containing compounds and the secondary amine-containing compounds include, for example, from about 25° C. to about 200° C., more suitably from about 60° C. to about 150° C., most suitably from about 80° C. to about 125° C. At temperatures below about 60° C., the mixture becomes too viscous for adequate mixing. At temperatures above about 150° C., the tertiary amine species from the reaction of the secondary amine with the epoxy group of the epoxy resin catalyzes side reactions. The side reactions increase molecular weight and viscosity up to and including gellation. The reaction is suitably carried out for a time of from about 0.025 to about 8, more suitably from about 0.05 to about 2 and most suitably from about 0.25 to 1 hour(s). Higher reaction temperatures require less time than do lower reaction temperatures.

Suitable solvent which can be employed in the reaction between the epoxy-containing compound and the phenol or secondary amine-containing compound include, for example, aliphatic and aromatic hydrocarbons, glycol ethers, glycol esters, alcohols, ketones, cyclic ethers, combinations thereof and the like. Particularly suitable such solvents include, hexane, heptane, octane, nonane, decane, benzene, toluene, xylene, 2-butoxyethanol, ethanol, propanol, butanol, pentanol, hexanol, heptanol, acetone, methyl ethyl ketone, dipropylene glycol methyl ether, diethylene glycol monobutyl ether, diethylene glycol methyl ether, diethylene glycol monopropyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monosiobutyrate, n-pentylpropionate, $C_6$ to $C_{13}$ alkyl acetates, any combination thereof and the like.

If desired, the reaction between the epoxycontaining compound and the phenol or substituted phenol or secondary amine-containing compound can be conducted in the presence of a catalytic amount of a suitable catalyst. Particularly suitable such catalysts include, phosphonium compounds, phosphines, quaternary ammonium compounds, tertiary amines, metal hydroxides, any combination thereof and the like. Particularly suitable such catalysts include, for example, ethyltriphenylphosphonium chloride, ethyltriphenylphosphonium bromide, ethyltriphenylphosphonium iodide, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate.acetic acid complex, tetrabutylphosphonium phosphate, triphenyl phosphine, N-methylmorpholine, sodium hydroxide, potassium hydroxide, tetrabutylammonium halide, benzyltrimethylammonium chloride, any combination thereof and the like.

Suitable monophenol compounds which can be employed herein include, for example those represented by the following formula

wherein each R is independently hydrogen, a halogen, particularly chlorine or bromine, a hydrocarbyl or hydrocarbyloxy group having from 1 to about 20, preferably from 1 to about 10, carbon atoms and which hydrocarbyl or hydrocarbyloxy groups can contain substitutent groups such as, for example, a nitro group, an alkyl or alkoxy group having from 1 to about 20, preferably from 1 to about 10, carbon atoms, and the like. Particularly suitable phenols include, for example, phenol, o-cresol, p-cresol, nonylphenol, chlorophenol, dichlorophenol, trichlorophenol, pentachlorophenol, bromophenol, dibromophenol, tribromophenol, trifluoro-m-cresol, 3-ethylphenol, 4-ethylphenol, 3-isopropylphenol, 4-n-propylphenol, 4-isopropylphenol, 3-tert-butylphenol, 4-sec-butylphenol, 4-tert-butylphenol, p-tert-amylphenol, 4-n-butoxyphenol, 4-heptyloxyphenol, 3,5-tert-butylphenol, 4-(tertoctyl)phenol, 3-n-pentadecylphenol, o-methoxyphenol, m-methoxyphenol, 2-methoxy-4-methylphenol, 4-ethyl-2-methoxyphenol, 3,4-methylenedioxyphenol, mixtures thereof and the like.

Suitable secondary amine-containing compounds which can be employed herein include, for example, those represented by the following formulas

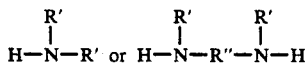

wherein each R' is independently a hydrocarbyl or hydrocarbyloxy group having from 1 to about 20, preferably from about 2 to about 10 carbon atoms, which hydrocarbyl or hydrocarbyloxy groups can contain substituent groups such as, for example, a nitro group, a hydroxyl group, or an alkyl group having from 1 to about 10 carbon atoms, and the like; and R" is a divalent hydrocarbyl group or a divalent hydrocarbyl group containing such substitutent groups as, for example, a nitro group, a hydroxyl group, or an alkyl group having from 1 to about 10 carbon atoms, and the like.

Particularly suitable secondary amines include, for example, diethylamine, dipropylamine, dibutylamine, di-n-nonylamine, di-n-dodecylamine, N-methyl-n-octadecylamine, diethanolamine, methylethanolamine, ethylethanolamine, bis(methoxyethyl)amine, bis(methoxypropyl)amine, bis(butoxyethyl)amine, bis(butoxypropyl)amine, piperidine, 4-ethylpiperidine, 2-piperidineethanol, piperazine, 3-piperidinemethanol, N-methylcyclohexylamine, N,N'-dimethylethylenediamine, N,N'-diethylethylenediamine, N,N'-bis(2-hydroxyethyl)ethylenediamine, 4,4'-bipiperidine, 4,4'-ethylenedipiperidine, 4,4'-trimethylenedipiperidine, mixtures thereof and the like. Secondary monoamines are the preferred amines.

Suitable polypyridine compounds which can be employed herein include any compound having more than one pyridine group per molecule. Particularly suitable such pyridine-containing compounds include, for example, those represented by the following formulas

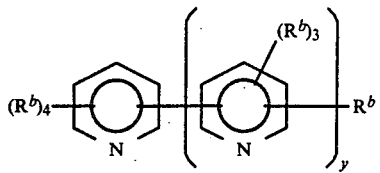

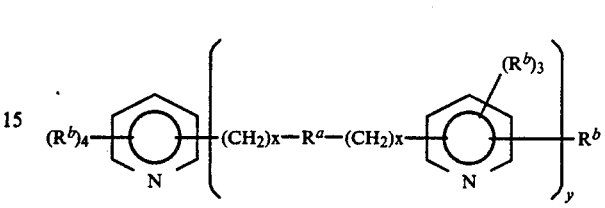

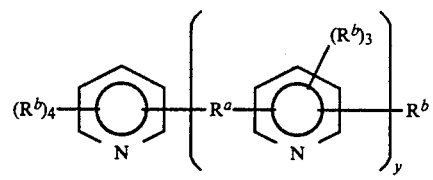

wherein $R^a$ is an alkyl group having from 1 to about 10 carbon atoms, an amine group, a urea group, a thiourea group, a carbonyl group, —S—S— group, —S—CH$_2$—CH$_2$—S—group, —C(OH)H—CO—group, or an amide group; each $R^b$ is independently selected from hydrogen, a halogen atom, particularly chlorine or bromine, a hydrocarbyl or hydrocarbyloxy or a hydroxyl substituted hydrocarbyl group having from 1 to about 10, preferably from 1 to about 4, carbon atoms, a carbamoyl group (—CO—NH$_2$), or a hydroxyl group: and each x and y independently has a value from 1 to about 5. Particularly suitable polypyridines include, for example, 1,2-bis(4-pyridyl)ethane, 4,4'-trimethylenedipyridine, 3,3-bipyridine, 4,4'-bipyridine, 4,4'-bipyridinehydrate, 2,3'-bipyridine, 2,4'-bipyridine, 4,4'-dimethyl-2,2'-bipyridine, 1,3-di-(3-picolyl)urea, 1,3-di-(3-picolyl)thiourea, di-(2-picolyl)amine, 2,2'-(3,6-dithiaoctamethylene)dipyridine, trans-1,2-bis(4-pyridyl)ethylene, 2,2',6',2''-terpyridine, aldrithiol-4, 2,2'-pyridil, α-methyl-1,2-di-3-pyridyl-1-propanone, α-pyridoin, combinations thereof and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the carbon atom to which it is attached.

If desired, the polypyridine compounds can be mixed with a monopyridine compound. Suitable monopyridine compounds include, for example, those represented by the following formula

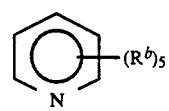

wherein each $R^b$ is independently selected from hydrogen, a halogen atom, particularly chlorine or bromine, a hydrocarbyl or hydrocarbyloxy or a hydroxyl substituted hydrocarbyl group having from 1 to about 10, preferably from 1 to about 6, carbon atoms, a carbamoyl group (—CO—NH$_2$), or a hydroxyl group. Particularly suitable monopyridine compounds include, for example, pyridine, 3-picoline, 4-picoline, 2-picoline, 3,4-dimethylpyridine, 3,5-dimethylpyridine, 4-phenylpyridine, 4-ethylpyridine, nicotinamide, mixtures thereof and the like.

The polypyridine compound and monopyridine compound can be employed in any proportion. Preferably, the polypyridine compound is employed in an amount of from about 10 to about 99, more preferably from about 50 to about 99, most preferably from about 75 to about 99 percent by weight based upon the combined weight of the polypyridine compound and the monopyridine compound and the monopyridine compound is employed in an amount of from about 1 to about 90, more preferably from about 1 to about 50, most preferably from about 1 to about 25 percent by weight based upon the combined weight of the polypyridine compound and the monopyridine compound.

The pyridine compounds are employed in an amount which provides a ratio of pyridine groups per epoxy group contained in component (A) of from about 0.15:1 to about 1.1:1, preferably from about 0.4:1 to about 1:1, more preferably from about 0.7:1 to about 0.9:1.

For water-borne systems, the charge density of the solid resin is used to determine the quantity of pyridine groups per epoxy group contained in component (A). The charge density is the milliequivalents of pyridine compound per gram of solid. A larger charge density is required for a high molecular weight epoxy resin than a low molecular weight epoxy resin to obtain a dispersion. For the same molecular weight epoxy resin, a low charge density gives an aqueous dispersion whereas a higher charge density may give an aqueous solution. The charge density may vary from about 0.08 to about 1.4, preferably from about 0.35 to about 0.6, more preferably from about 0.35 to 0.45 milliequivalents of pyridine compound per gram of solid.

Suitable Brönsted acids which can be employed herein include any such acid or combination of acids which promotes the reaction between the pyridine compound and the epoxide group and provide a compatible anion in the final product. Monobasic acids are usually preferred. Suitable inorganic acids which can be employed herein include, for example, phosphoric acid, hydrochloric acid, hydrobromic acid, nitric acid, sulfuric acid, any combination thereof and the like. Suitable organic acids which can be employed herein include, for example, those saturated or unsaturated acids having from about 2 to about 30 carbon atoms. Particularly suitable acids include, for example, acetic acid, propionic acid, acrylic acid, methacrylic acid, methacrylic acid, itaconic acid, maleic acid, glycolic acid, lactic acid, citric acid, ethanesulfonic acid, decanoic acid, triacontanoic acid, any combination thereof and the like.

The Brönsted acid is employed in an amount which provides from about 0.2 to about 10, preferably from about 0.5 to about 1.5, more preferably from about 1 to about 1.1, moles of acid per pyridine group.

If desired, the aqueous compositions of the present invention can also contain minor amounts of an organic solvent such as, for example, ethylene glycol monobutyl ether, ethylene glycol monomethyl ether, diethylene glycol monopropyl ether, diethylene glycol monobutyl ether, diethylene glycol monohexyl ether, propylene glycol monopropyl ether, propylene glycol monobutyl ether, propylene glycol tertiary butyl ether, propylene glycol isopropyl ether, dipropylene glycol monobutyl ether, ethylene glycol phenyl ether, propylene glycol phenyl ether, 2,2,4-trimethyl-1,3-pentanediol monoisobutyrate, n-pentyl propionate, $C_6$ to $C_{13}$ alkyl acetates, butanol, acetone, methyl ethyl ketone, methyl iosbutyl ketone, any combination thereof and the like. Particularly suitable such solvents include, for example, ethylene glycol monobutyl ether (2-butoxyethanol), ethylene glycol monomethyl ether (2-methoxyethanol), butanol, any combination thereof and the like.

These solvents are employed in amounts of from about 1 to about 35, preferably from about 5 to about 10, more preferably from about 5 to about 7, percent by weight based upon the weight of the aqueous dispersion or solution.

Suitable curing agents which can be employed in the curable compositions of the present invention include, for example, urea-aldehyde resins, alkylated urea-aldehyde resins, melamine-aldehyde resins, alkylated melamine-aldehyde resins, phenol-aldehyde resins, alkylated phenol-aldehyde resins, blocked isocyanates, combinations thereof and the like. Suitable blocked isocyanates which can be employed herein as curing agents include, for example, those described in U.S. Pat. No. 3,959,106 to Bosso et al which is incorporated herein by reference in its entirety. Particularly, suitable curing agents include, for example, hexamethoxymethylmelamine, highly methylated melamine-formaldehyde resin, highly alkylated ethoxy methoxy melamine-formaldehyde resin and highly alkylated methoxymethyl, isobutoxymethyl melamine-formaldehyde resin commercially available as CYMEL TM 303, CYMEL TM 325, CYMEL TM 1116 and CYMEL TM 1161, respectively from the American Cyanamide Co.: RESIMENE TM 730 and RESIMENE TM 735 melamine-formaldehyde solutions commercially available from Monsanto Co.; BEETLE TM 60 and BEETLE TM 65 ureaformaldehyde resins commercially available from the American Cyanamide Co.: a mixture of the allyl ethers of mono-, di-, and tri-methylol phenols, a mixture of allyl ethers of methylol phenol partially polymerized and phenol formaldehyde synthetic resin, commercially available as METHYLON TM 75-108, METHYLON TM 75-121 and VARCUM SYNTHETIC RESIN TM 29-101 from BTL Specialty Resins Corp., 2-ethylhexanol blocked prepolymer of tolylene diisocyanate and trimethylol propane, 2-ethylhexanol blocked prepolymer of diphenylmethane 4,4'-diisocyanate, diethylene glycol and tripropylene glycol, mixtures thereof and the like.

The curing agents are suitably employed in amounts sufficient to cure the resultant product into an insoluble and infusable product. The curing agents are usually employed in amounts suitably from about 1 to about 50, more suitably from 5 to about 30, most suitably from about 10 to about 25, percent by weight based upon the weight of the modified epoxy resin.

If desired, promoters or accelerators can be employed with the urea-aldehyde resins, alkylated urea-aldehyde resins, melamine-aldehyde resins, alkylated melamine-aldehyde resins, phenol-aldehyde resins or alkylated phenol-aldehyde resins. Suitable such accelerators or promoters include, for example, phosphoric acid, polyphosphoric acid, maleic acid, citric acid, organic sulfonic acids such as for example, benzene sulfonic acid, p-toluene sulfonic acid, naphthalene sulfonic acid, dodecylbenzene sulfonic acid, mixtures thereof and the like.

If desired, the coating composition can be formulated with conventional additives. Suitable such additives include, for example, antifoam agents, flow control agents, slip agents, adhesion promoters, flexibility promoters, surface tension modifiers, stress release agents, gloss reducing materials, rheology modifiers, stabilizers, surfactants, coalescing solvents, reactive diluents, plasticizers and the like. A partial list of suitable additives, include, for example, methacrylamide functional amine adduct of neopentyl(diallyl)oxy, tri(diocyl)pyro-phosphato titanate which is commercially available from Kenrich Petrochemicals, Inc. as LICA 38J: methacrylamide functional amine adduct of neopentyl(diallyl)oxy, tri(diocyl)pyro-phosphato zirconate which is commercially available from Kenrich Petrochemicals, Inc. as LZ 38J: a solution of polyether modified methyl alkyl polysiloxanes which is commercially available from BYK-Chemie as BYK-321: a solution of polyether modified dimethyl polysiloxanes which is commercially available from BYK-Chemie as BYK-306; an acrylic copolymer which is commercially available from BYK-Chemie as BYK-361; and a silicone resin solution which is commercially available as SR882M from General Electric.

The coating compositions can be pigmented and/or opacified with known pigments and opacifiers. For many uses, including food uses, the preferred pigment is titanium dioxide. Generally, the pigment is used in a pigment to binder ratio of from about 0.1:1 to about 1:1 by weight. Other pigments include, antimony oxide, zinc oxide, white lead, calcium carbonate, silica, aluminum silicate, magnesium silicate, aluminum potassium silicate, any combination thereof and the like.

The modified epoxy resins of the present invention can be employed to prepare castings, moldings, coatings, and the like.

The coating compositions can be applied by any conventional method known in the coating industry. Therefore, spraying, rolling, dipping, flow control or electrodeposition applications can be employed for both clear and pigmented films. Spraying is the preferred technique for the aqueous coating compositions. After application onto the substrate, the coating is thermally cured at temperatures of from about 95° C. to about 235° C. or higher, for periods in the range of from about 1 to 60 minutes. The resultant films can be dried at ambient temperatures for longer periods of time.

The following examples are illustrative of the invention, but are not to be construed as to limiting the scope thereof in any manner.

The following tests are employed in evaluating the coating compositions.

METHYL ETHYL KETONE (MEK) RESISTANCE

The resistance of the cured coating to removal with methyl ethyl ketone is determined by rubbing across the baked panels a two pound ball pein hammer with the ball end covered with eight layers of cheesecloth which has been saturated with methyl ethyl ketone (MEK). No force is applied to the hammer other than that necessary to guide the hammer back and forth over the same area. A forward and reverse stroke returning to the starting point is considered as being one MEK double rub. A copper sulfate-hydrochloric acid-water solution is applied to the rubbed surface of the cured coatings and allowed to stand one minute to determine breakthrough. MEK resistance is related to the number of MEK double rubs. The amount of MEK double rubs required for a pass varies according to different coating applications. The National Coil Coaters Association (NCCA) recommend 25 MEK double rubs as being adequate for a pass in most applications.

T-BEND

T-Bend is used as a measure of the flexibility of the coating on the panel. The edges of the panel are cut to leave a two inch wide specimen of uniform thickness. A bend is made in the panel at approximately 0.75 inches from the end of the coated panel by using a fingerbrake. The bend is squeezed tighter with the palm of the hand. Then the bent specimen was placed in a vice, which is previously taped with plastic tape to prevent scratching the substrate, and the panel is bent back on itself to form a 180 degree bend. The stressed area is then tested for adhesion by taping with Scotch 610 tape. The tape is applied in such a manner where no air bubbles are trapped under the tape. The tape is then pulled with a rapid and forceful fashion at a 90 degree angle in an attempt to pull the coating away from the substrate. Next, a solution of copper sulfate (10 grams)in 1.0 N hydrochloric acid is applied to the stressed area. The purpose of this step is to oxidize any resulting bare metal in order to more accurately observe adhesion failures. The specimen is examined under a magnifying glass to determine failure. The first bend is noted as T0 (T zero) because there is no panel sandwiched between the bend. The process of bending the panel by using the fingerbrake and vice is continued until there was no sign of cracking or adhesion loss. Each successive bend is noted as T1, T2, T3, T4, etc. because of the number of layers of panel sandwiched between plys. The lower the number of T-bends, the better the flexibility.

IMPACT RESISTANCE

Coated panels are subjected to the impact of a falling weight from a Gardner Impact Tester at different calibrated heights ranging from 0 to 160 inch-pounds. The impacted area is then tested for adhesion by taping with Scotch 610 tape. The tape is applied in such a manner that no air bubbles are trapped under the tape. The tape is then pulled with a rapid and forceful fashion at a 90 degree angle in an attempt to pull the coating away from the substrate. Next, a solution of copper sulfate (10 grams) in 1.0N hydrochloric acid (90 grams) is applied to the impacted area to check for failure.

EXAMPLE 1

A bisphenol A based epoxy resin having an epoxide equivalent weight of 932 (220 grams, 0.2361 equivalent) and 55.0 grams of 2-butoxyethanol (0.465 mole) are added to a four neck 1 liter glass flask equipped with a means for purging nitrogen, temperature control, stirring, condensing and reactant addition. The epoxy resin is slowly dissolved by heating to 125° C. Once the resin is dissolved, the nitrogen adapter which has no dip leg is replaced with one having a four inch dip leg to obtain vigorous bubbling action below the surface. Then the resin is cooled to 90° C. In a eight ounce bottle is mixed 106.2 grams deionized water (5.9 moles), 11.93 grams 4,4'-trimethylenedipyridine (0.0602 mole), and 23.80 grams of an aqueous solution of 85% lactic acid (0.2246 mole). This solution is then added dropwise over a period of 59 minutes while maintaining the reaction temperature at 90° C. The mixture is stirred at 90° C. for an additional seven hours. Then 508 grams deionized water is added to the pink reactor contents over a twenty-seven minute period while maintaining the reaction temperature at 90° C. The pink colored aqueous dispersion with a non-volatile content of 25 percent and charge density of 0.52 milliequivalent/gram resin is allowed to cool to ambient temperature with stirring. The pH of the stable aqueous dispersion is 4.0. The viscosity which is measured with a Ford Cup No. 4 is 13.2 seconds. The volatile organic content of the dispersion is 1.6 pounds per gallon (192 grams/liter).

EXAMPLE 2

Coatings are prepared by blending 61.6 grams of the aqueous solution prepared in Example 1, with 3.15 grams of CYMEL TM 325 to give a formulation containing 20 parts per hundred resin (phr) CYMEL TM 325. CYMEL TM 325 is a high imino (—NH) melamine-formaldehyde resin which is commercially available from the American Cyanamid Co. The coating is applied to 24 gauge×4 inches×12 inches (0.66 mm×101.6 mm×304.8 mm) unpolished cleantreated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

EXAMPLE 3

A bisphenol A based epoxy resin having an epoxide equivalent weight of 932 (220 grams, 0.2360 equivalent) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 90° C. In a eight ounce bottle is mixed 106.2 grams deionized water (5.9 moles), 11.07 grams 1,2-bis(4-pyridyl)ethane (0.0601 mole), and 23.8 grams of an aqueous solution of 85% lactic acid (0.2246 moles). This solution is then added dropwise over a period of 58 minutes while maintaining the reaction temperature at 90° C. The chalky white mixture is stirred at 90° C. for an additional four hours. Then the temperature is increased to 95° C. and maintained for an additional four hours and thirty minutes. Then 481 grams deionized water is added to the light pink reactor contents over a forty-two minute period. The lavender colored aqueous dispersion with a non-volatile content of 28 percent and charge density of 0.52 milliequivalent/gram resin is allowed to cool with stirring. The pH of the stable aqueous dispersion is 3.7. The viscosity which is measured with a Ford Cup No. 4 is 19.1 seconds. The volatile organic content of the dispersion is 1.6 pounds per gallon (192 grams/liter).

EXAMPLE 4

Coatings are prepared by blending 57.5 grams of the aqueous solution prepared in Example 3, with 1.64 grams of CYMEL TM 325 to give a formulation containing 10.2 parts per hundred resin (phr) CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

EXAMPLE 5

A bisphenol A based epoxy resin having an epoxide equivalent weight of 1755 (220 grams, 0.1254 equivalent) and 55.0 grams of 2-butoxyethanol (0.465 mole) are added to reactor of the type described in Example 1. The epoxy resin is slowly dissolved by heating to 125° C. Once the resin is dissolved, the nitrogen adapter is replaced with one having a four inch dip leg to obtain vigorous bubbling action below the surface. Then the resin is cooled to 90° C. In a four ounce bottle is mixed 56.58 grams deionized water (3.14 moles), 9.40 grams 4,4'-trimethylenedipyridine (0.0474 mole), and 12.64 grams of an aqueous solution of 85% lactic acid (0.1192 mole). This solution is then added dropwise over a period of 26 minutes while maintaining the reaction temperature at 90° C. The mixture is stirred between 90° C. and 92° C. for 3 hours and at 95° C. for 4 hours. Then 503.9 grams deionized water is added to the reactor contents over a 36 minute period while maintaining the reaction temperature between 80° C. and 90° C. The lavender colored aqueous dispersion with a non-volatile content of 28 percent and charge density of 0.39 milliequivalent/gram resin is allowed to cool with stirring. The pH of the stable aqueous dispersion is 4.0. The viscosity which is measured with a Ford Cup No. 4 is 14.3 seconds. The volatile organic content of the dispersion is 1.6 pounds per gallon (192 grams/liter).

EXAMPLE 6

Coatings are prepared by blending 42.9 grams of the aqueous solution prepared in Example 5, with 2.39 grams of CYMEL TM 325 to give a formulation containing 20 parts per hundred resin (phr) CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

EXAMPLE 7

A bisphenol A based epoxy resin having an epoxide equivalent weight of 1755 (220 grams, 0.1254 equivalent) and 55.0 grams of 2-butoxyethanol (0.465 mole) are added to a reactor of the type described in Example 1. The resin is slowly dissolved by heating to 120° C. Once the resin is dissolved, the nitrogen adapter is replaced with one having a four inch dip leg to obtain vigorous bubbling action below the surface. Nonylphenol (6.92 grams, 0.0314 mole) and 0.2074 gram of a 70 percent by weight solution in methanol of tetrabutylphosphonium acetate.acetic acid complex catalyst is added to the reactor contents. The temperature is raised to 150° C. and held at 150° C. for 64 minutes. Then the reactor contents are cooled to 90° C. In a four ounce bottle is mixed 56.63 grams deionized water (3.15 moles), 9.365 grams 4,4'-trimethylenedipyridine (0.0472 mole), and 12.64 grams of an aqueous solution of 85% lactic acid ( 0.1193 mole). This solution is then added dropwise over a period of 16 minutes while maintaining the reaction temperature at 90° C. The mixture is stirred at 91° C. for 5 hours and at 95° C. for an additional 2 hours. Then 462.7 grams deionized water is added to the reactor contents over a 40 minute period between 82° C. and 92° C. The pink colored aqueous dispersion with a non-volatile content of 29 weight percent and charge density of 0.38 milliequivalent/gram resin is allowed to cool with stirring. The pH of the stable aqueous dispersion is 3.9. The viscosity which is measured with a Ford Cup No. 4 is 12.6 seconds. The volatile organic content of the dispersion is 1.6 pounds per gallon (192 grams/liter).

EXAMPLE 8

Coatings are prepared by blending 64.9 grams of the aqueous dispersion prepared in Example 7, with 1.94 grams CYMEL TM 325 to give a formulation containing 10 parts per hundred resin (phr) CYMEL TM 325. The coating is applied to 24 gauge×4 inches×12 inches (0.66 mm× 101.6 mm×304.8 mm) unpolished clean-treated cold rolled steel panels with a No. 16 wire-wound rod according to ASTM D 4147-82. The coating was baked in an oven at 400° F. (204.4° C.) for 10 minutes. The thickness of the coating is between 0.2 and 0.3 mils (0.00508 mm and 0.00762 mm).

EXAMPLE 9

Coatings are prepared by blending 65.99 grams of the aqueous solution prepared in Example 7, with 2.97 grams of CYMEL TM 325 to give a formulation containing 15 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

EXAMPLE 10

A bisphenol A based epoxy resin having an epoxide equivalent weight of 1755 (220 grams, 0.1254 equivalent) and 55.0 grams of 2-butoxyethanol (0.465 mole) are added to a reactor of the type described in Example 1. The resin is slowly dissolved by heating to 120° C. Once the resin is dissolved, the nitrogen adapter is replaced with one having a four inch dip leg to obtain vigorous bubbling action below the surface. Diethanolamine (3.345 grams. 0.0318 mole) and 1.527 grams 2-butoxyethanol are added dropwise to the reactor contents and allowed to digest at 120° C. for 33 minutes. Then the resin is cooled to 90° C. In a four ounce bottle is mixed 56.585 grams deionized water (3.14 moles), 9.325 grams 4,4'-trimethylenedipyridine (0.0470 mole), and 10.705 grams of an aqueous solution of 85% lactic acid (0.1010 mole). This solution is then added dropwise over a period of twenty-one minutes while maintaining the reaction temperature at 90° C. The mixture is stirred at 90° C. for an additional 3 hours and then at 94° C. for four hours. Then 334.3 grams deionized water is added to the reactor contents over a fifteen minute period. The pink colored dispersion with a nonvolatile content of 35 percent and charge density of 0 39 milliequivalent/gram resin is allowed to cool with stirring. Deionized water (108.1 grams) is added to the aqueous dispersion (648.4 grams) to give a dispersion with a non-volatile content of 30 percent. The pH of this stable aqueous solution is 5.0. The viscosity which is measured with a Ford Cup No. 4 is 41.2 seconds. The volatile organic content of the dispersion is 1.7 pounds per gallon (204 grams/liter).

EXAMPLE 11

Coatings are prepared by blending 52.8 grams of the aqueous solution prepared in Example 10 after dilution to 28 percent by weight non-volatiles, with 2.29 grams of CYMEL TM 325 to give a formulation containing 16 parts per hundred resin (phr) CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels were baked in an oven at 400° F. (204.4° C.) for 10 minutes. The thickness of the coating is between 0.2 and 0.3 mils (0.00508 mm and 0.00762 mm).

EXAMPLE 12

A bisphenol A based epoxy resin having an epoxide equivalent weight of 1755 (220 grams, 0.1254 equivalent) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 90° C. In a four ounce bottle is mixed 56.57 grams deionized water (3.14 moles), 8.659 grams 1,2-bis(4-pyridyl)ethane (0.0470 mole), and 12.63 grams of an aqueous solution of 85% lactic acid (0.1192 mole). This solution is then added dropwise over a period of 33 minutes while maintaining the reaction temperature between 89° C. and 95° C. The mixture is stirred at 90° C. for an additional 4 hours and then at 4 hours between 95° C. and 97° C. Then 445.2 grams deionized water is added to the pink reactor contents over a 37 minute period while maintaining the reaction temperature between 84° C. and 97° C. The pink colored aqueous dispersion with a non-volatile content of 30 percent and charge density of 0.39 milliequivalent/gram resin is allowed to cool to ambient temperature with stirring. The pH of the stable aqueous dispersion is 4.1. The viscosity which is measured with a Ford Cup No. 4 is 30.4 seconds. The volatile organic content of the dispersion is 1.6 pounds per gallon (192 grams/liter).

EXAMPLE 13

Coatings are prepared by blending 63.18 grams of the aqueous solution prepared in Example 12, with 2 92 grams of CYMEL TM 325 TM to give a formulation containing 15 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panel is baked in an oven at 400° F. (204.4° C.) for 10 minutes. The thickness of the coating is between 0.2 and 0.3 mils (0.00508 mm and 0.00762 mm).

EXAMPLE 14

A bisphenol A based epoxy resin having an epoxide equivalent weight of 1755 (220 grams, 0.1254 equivalent) and 55.0 grams of 2-butoxyethanol (0.465 mole) are added to a reactor of the type described in Example 1. The resin is slowly dissolved by heating to 120° C. Once the resin is dissolved, the nitrogen adapter is replaced with one having a four inch dip leg to obtain vigorous bubbling action below the surface. Then nonylphenol (6.91 grams, 0.0314 mole) and 0.2056 gram of tetrabutylphosphonium acetate.acetic acid complex catalyst is added to the reactor contents. The reactor contents are heated to 152° C. and maintained between 150° C. and 160° C. for 73 minutes. They are then cooled to 90° C. In a four ounce bottle is mixed 56.58 grams deionized water (3.14 moles), 8.676 grams 1,2-bis(4-pyridyl)ethane (0.0471 mole), and 12.689 grams of an aqueous solution of 85% lactic acid (0.1197 mole). This solution is then added dropwise over a period of 18 minutes. The reactor contents are stirred at 91° C. for 3 hours and at 94° C. for an additional 5 hours. Then 461.0 grams deionized water is added to the reactor contents over a 30 minute period while maintaining the reaction temperature between 77° C. and 93° C. The lavender colored aqueous dispersion with a non-volatile content of 30 weight percent and charge density of 0.38 milliequivalent/gram resin is allowed to cool with stirring. The pH of the stable aqueous dispersion is 3.8. The viscosity which is measured with a Ford Cup No. 4 is 13.1 seconds. The volatile organic content of the dispersion is 1.6 pounds per gallon (192 grams/liter).

EXAMPLE 15

Coatings are prepared by blending 54.2 grams of the aqueous solution prepared in Example 14, with 2.42 grams of CYMEL TM 325 to give a formulation containing 15 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panel is baked in an oven at 400° F. (204.4° C.) for 10 minutes. The thickness of the coating is between 0.2 and 0.3 mils (0.00508 mm and 0.00762 mm).

EXAMPLE 16

A bisphenol A based epoxy resin having an epoxide equivalent weight of 932 (220 grams, 0.2360 equivalent) and 55.0 grams (0.465 mole) of 2-butoxyethanol are added to a reactor of the type described in Example 1. The resin is slowly dissolved by heating to 120° C. Once the resin is dissolved, the nitrogen adapter is replaced with one having a four-inch dip leg to obtain vigorous bubbling action below the surface. Then the resin is cooled to 93° C. In an eight-ounce bottle, is mixed 106.6 grams (5.92 moles) deionized water, 19.09 grams (0.4486 mole) 1,3-di-(3-picolyl)thiourea acid. This solution is then added dropwise over a period of 48 minutes while maintaining the temperature between 82° C. and 93° C. The mixture is stirred between 90° C. and 97° C. for an additional seven hours and two minutes. Then 669.7 grams deionized water is added to the white opaque reactor contents over a thirty minute period. The pale yellow with blue tint colored aqueous solution with a non-volatile content of 25 percent and charge density of 0.53 milliequivalent/gram resin is allowed to cool with stirring. The pH of the stable aqueous dispersion is 3.2. The viscosity which is measured with a Ford Cup No. 4 is 11.3 seconds. The volatile organic content of the dispersion is 1.4 pounds per gallon (168 grams/liter).

EXAMPLE 17

A bisphenol A based epoxy resin having an epoxide equivalent weight of 932 (110 grams, 0.1180 equivalent) and 27.54 grams (0.233 mole) of 2-butoxyethanol are added to a four-neck 500 milliliter glass flask equipped with a means for purging nitrogen, temperature control, stirring, condensing and reactant addition. The resin is slowly dissolved by heating to 127° C. Once the resin is dissolved, it is cooled to 90° C. In an eight-ounce bottle is mixed 55.47 grams (3.08 moles) deionized water, 8.76 grams (0.0561 mole) 3,3'-bipyridine, and 13.18 grams (0.124 mole) of an aqueous solution of 85% lactic acid. This solution is then added dropwise over a period of 31 minutes while maintaining the reaction temperature between 85° C. and 90° C. The mixture is stirred between 87° C. and 92° C. for an additional 7 hours and 19 minutes. Then 304.8 grams deionized water is added to the yellow reactor contents over a 17-minute period while maintaining the reaction temperature between 68° C. and 80° C. The yellow green colored aqueous solution with a non-volatile content of 25 weight percent and charge density of 0.86 millimole/gram resin is allowed to cool with stirring. The pH of the stable aqueous solution is 3.8. The viscosity which is measured with a Ford Cup No. 4 is 13.5 seconds. The volatile organic content of the solution is 1.5 pounds per gallon (180 grams/liter).

EXAMPLE 18

A bisphenol A based epoxy resin having an epoxide equivalent weight of 932 (220 grams, 0.2360 equivalent) and 55.0 grams of 2-butoxyethanol (0.465 mole) are added to a reactor of the type described in Example 1. The resin is slowly dissolved by heating to 124° C. Once the resin is dissolved, the nitrogen adapter is replaced with one having a four-inch dip leg to obtain vigorous bubbling action below the surface. Then the resin is cooled to 90° C. In an eight-ounce bottle is mixed 119.2 grams (6.62 moles) deionized water, 16.62 (0.1064 mole) grams 4,4'-bipyridine, and 23.87 grams (0.2252 mole) of an aqueous solution of 85% lactic acid. This solution is then added dropwise over a period of 58 minutes while maintaining the temperature between 82° C. and 90° C. The mixture is stirred between 88° C. and 97° C. for an additional eleven hours. Then 421.7 grams deionized water is added to the green and opaque reactor contents over a twenty-five minute period. The light brown colored aqueous dispersion with a nonvolatile content of 32 percent and charge density of 0.83 milliequivalent/gram resin is allowed to cool with stirring. The aqueous dispersion is only marginally dispersible since it starts to separate in about a day. The pH of the stable aqueous dispersion is 3.75. The viscosity which is measured with a Ford Cup No. 4 is 13.1 seconds. The volatile organic content of the dispersion if 1.6 pounds per gallon (192 grams/liter).

EXAMPLE 19

A bisphenol A based epoxy resin having an epoxide equivalent weight of 1755 (220 grams, 0.1254 equivalent) and 55.0 grams (0.465 mole) of 2-butoxyethanol are added to a reactor of the type described in Example 1. The resin is slowly dissolved by heating to 125° C. Once the resin is dissolved, the nitrogen adapter is replaced with one having a four-inch dip leg to obtain vigorous bubbling action below the surface. Then the resin is cooled to 87° C. In an four-ounce bottle is mixed 56.6 grams deionized water (3.14 moles), 6.21 grams (0.0313 mole) 4,4'-trimethylenedipyridine, 3.84 grams (0.0314 mole) nicotinamide and 7.19 grams (0.1197 mole) of glacial acetic acid. This solution is then added dropwise over a period of 32 minutes while maintaining the temperature between 81° C. and 89° C. The pink colored opaque mixture is stirred between 89° C. and 92° C. for an additional seven hours and 3 minutes. Then 442.1 grams deionized water is added to the pink colored reactor contents over a sixteen-minute period. The lavender colored aqueous dispersion with a non-volatile content of 30 percent and charge density of 0.40 milliequivalent/gram resin is allowed to cool with stirring. The pH of the stable aqueous dispersion is 4.95. The viscosity which is measured with a Ford Cup No. 4 is 12.8 seconds. The volatile organic content of the dispersion is 1.7 pounds per gallon (204 grams/liter).

EXAMPLE 20

A bisphenol A based epoxy resin having an epoxide equivalent weight of 932 (220 grams, 0.2360 equivalent) and 55.0 grams of 2-butoxyethanol (0.465 mole) are added to a reactor of the type described in Example 1. The resin is slowly dissolved by heating to 127° C. Once the resin is dissolved, the nitrogen adapter is replaced with one having a four-inch dip leg to obtain vigorous bubbling action below the surface. Then the reactor contents are cooled to 82° C. In an two-ounce bottle is mixed 25.0 grams 2-butoxyethanol (0.2115 mole) and 17.633 grams 4,4'-trimethylenedipyridine (0.08893 mole). This solution is then added dropwise over a period of 8 minutes while maintaining the temperature between 75° C. and 84° C. In a four-ounce bottle is mixed 53.5 grams deionized water and 23.80 grams of an aqueous solution of 85% lactic acid (0.2246 mole). This solution is added over a period of two minutes while maintaining the temperature at 85° C. immediately after completion of the addition of the 2-butoxyethanol solution of 4,4'-trimethylenedipyridine. The reactor contents are stirred between 77° C. and 80° C. for an additional seventy-one minutes. Fourier transform infrared spectroscopy supports the presence of an amide group by a sharp absorption band at 1639 cm$^{-1}$ which is attributed to the carbonyl stretching vibration of an amide. Then 636.8 grams deionized water is added to the black reactor contents over a thirty-five minute period. The black colored aqueous solution with a non-volatile content of 25 percent and charge density of 0.69 milliequivalent/gram resin is allowed to cool with stirring. The pH of the stable aqueous dispersion is 4 4. The viscosity which is measured with a Ford Cup No. 4 is 118 seconds. The volatile organic content of the dispersion is 2.1 pounds per gallon (247 grams/liter).

EXAMPLE 21

A bisphenol A based epoxy resin having an epoxide equivalent weight of 932 (220.1 grams, 0.2360 equivalent) and 55.0 grams (0.465 mole) of 2-butoxyethanol are added to a reactor of the type described in Example 1. The resin is slowly dissolved by heating to 125° C. Once the resin is dissolved, the nitrogen adapter is replaced with one having a four-inch dip leg to obtain vigorous bubbling action below the surface. In an eight-ounce bottle is mixed 55.43 grams (0.469 mole) of 2-butoxyethanol, 17.58 grams (0.8867 mole) 4,4'-trimethylenedipyridine, and 13.48 grams (0.2245 mole) of glacial acetic acid. This solution is then added dropwise over a period of 41 minutes while maintaining the temperature between 110° C. and 125° C. The dark blue mixture is stirred between 120° C. and 122° C. for an additional 6 hours and 6 minutes. The temperature controller is set to 75° C. Then 266.3 grams 2-butoxyethanol is added to the reactor contents over a two-minute period. The black colored 2-butoxyethanol solution with a non-volatile content of 40 percent and charge density of 0.71 milliequivalent/gram resin is allowed to cool with stirring. The solution is further diluted with 2-butoxyethanol to give a black solution with a non-volatile content of 30 percent. The viscosity which is measured with a Ford Cup No. 4 is 77.8 seconds.

EXAMPLE 22

Coatings are prepared by blending 52.1 grams of the 2-butoxyethanol solution prepared in Example 21, with 3.19 grams METHYLON TM 75-108, 0.182 grams 85% phosphoric acid and 0.015 grams of a 10% solution of BYK-361 in 2-butoxyethanol to give a formulation containing 20 parts per hundred resin (phr) METHYLON TM 75-108. METHYLON TM 75-108 is a mixture of the allyl ethers of mono-, di- and tri-methylol phenols which is commercially available from BTL Specialty Resins Corp. BYK-361 is an acrylic copolymer which is commercially available from BYK-Chemie which is employed as a flow modifier. The coating is applied to degreased tin free steel can stock with a No. 22 wire wound rod according to ASTM D 4147-82. The tin free steel panel is degreased by washing the panel with aromatic 100 followed by acetone. The washed panel is then placed in an oven at 400° F. for 5 minutes. The coated panel is baked in an oven at 400° F. (204.4° C.) for ten minutes. The thickness of the coating is 0.34 mil (0.00864 mm). The film survived 26 methyl ethyl ketone double rubs before the metal surface is exposed.

COMPARATIVE EXPERIMENT A

A bisphenol A based epoxy resin having an epoxide equivalent weight of 1755 (220.1 grams, 0.1254 equivalent) and 55.0 grams (0.465 mole) of 2-butoxyethanol are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 70° C. In a four ounce bottle is mixed 56.61 grams (3.14 moles) deionized water, 7.438 grams (0.09403 mole) pyridine, and 12.649 grams (0.1193 mole) of an aqueous solution of 85% lactic acid. This solution is then added dropwise over a period 34 minutes while maintaining the reaction temperature at 70° C. The mixture is stirred between 62° C. and 77° C. for six hours. Then 498.9 grams deionized water is added to the reactor contents over a nineteen minute period while maintaining the reaction temperature between 61° C. and 70° C. The gray colored aqueous dispersion with a non-volatile content of 28 percent and charge density of 0.39 milliequivalent/gram resin is allowed to cool with stirring. The pH of the stable aqueous dispersion is 5.4. The viscosity which is measured with a Ford Cup No. 4 is 14.2 seconds. The volatile organic content of the dispersion is 1.6 pounds per gallon (192 grams/liter).

COMPARATIVE EXPERIMENT B

Coatings are prepared by blending 66.8 grams of the aqueous dispersion prepared in Comparative Experiment A, with 1.88 grams CYMEL TM 325 to give a formulation containing 10 parts per hundred resin (phr) CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D-4147-82. The coating is baked in an oven at 400° F. (204.4° C.) for 10 minutes. The thickness of the coating is between 0.2 and 0.3 mils (0.00508 mm and 0.00762 mm).

COMPARATIVE EXPERIMENT C

Coatings are prepared by blending 56.7 grams of the aqueous solution prepared in Comparative Experiment A, with 2.37 grams of CYMEL TM 325 to give a formulation containing 15 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

COMPARATIVE EXPERIMENT D

Coatings are prepared by blending 55.2 grams of the aqueous dispersion prepared in Comparative Experiment A, with 3.04 grams CYMEL TM 325 to give a formulation containing 20 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coating is baked in an oven at 400° F. (204.4° C.) for 10 minutes. The thickness of the coating is between 0.2 and 0.3 mils (0.00508 mm and 0.00762 mm).

COMPARATIVE EXPERIMENT E

A bisphenol A based epoxy resin having an epoxide equivalent weight of 1755 (220.1 grams, 0.1254 equivalent) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 73° C. In a four ounce bottle is mixed 56.55 grams deionized water (3.14 moles), 8.778 grams 3-picoline (0.09426 mole), and 12.66 grams of an aqueous solution of 85% lactic acid (0.1195 mole). This solution is then added dropwise over a period of 42 minutes while maintaining the reaction temperature between 65° C. and 68° C. The mixture is stirred between 68° C. and 87° C. for 11 hours. Then 502.4 grams deionized water is added to the reactor over a thirty-nine minute period. The resultant beige colored aqueous dispersion with a non-volatile content of 28 percent and charge density of 0.39 milliequivalent/gram resin is allowed to cool with stirring. The pH of the stable aqueous solution is 4.7. The viscosity which is measured with a Ford Cup No. 4 is 12.9 seconds. The volatile organic content of the dispersion is 1.6 pounds per gallon (192 grams/liter).

COMPARATIVE EXPERIMENT F

Coatings are prepared by blending 60.9 grams of the aqueous solution prepared in Comparative Experiment E, with 2.60 grams of CYMEL TM 325 to give a formulation containing 15 parts CYMEL TM 325 per hundred resin (phr). The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

COMPARATIVE EXPERIMENT G

Coatings are prepared by blending 53.9 grams of the aqueous dispersion prepared in Comparative Experiment E, with 3.72 grams CYMEL TM 325 to give a formulation containing 25 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coating is baked in an oven at 400° F. (204.4° C.) for 10 minutes. The thickness of the coating is between 0.2 and 0.3 mils (0.00508 mm and 0.00762 mm).

COMPARATIVE EXPERIMENT H

A bisphenol A based epoxy resin having an epoxide equivalent weight of 1755 (220.0 grams, 0.1254 equivalent) and 55.0 grams (0.465 mole) of 2-butoxyethanol are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 83° C. In a four ounce bottle is mixed 56.56 grams (3.14 moles) deionized water, 8.77 grams (0.09417 mole) 4-picoline, and 12.642 grams (0.1193 mole) of an aqueous solution of 85% lactic acid. This solution is then added dropwise over a period of 46 minutes while maintaining the reaction temperature between 67° C. and 83° C. The mixture is stirred between 68° C. and 74° C. for 6 hours. Then 502.4 grams deionized water is added to the reactor contents over a forty-five minutes period. The light brown colored aqueous solution with a non-volatile content of 28 percent and charge density of 0.39 milliequivalent/gram resin is allowed to cool with stirring. The pH of the stable aqueous dispersion is 5.5. The viscosity which is measured with a Ford Cup No. 4 is 12.5 seconds. The volatile organic content of the dispersion is 1.6 pounds per gallon (192 grams/liter).

COMPARATIVE EXPERIMENT I

Coatings are prepared by blending 56.8 grams of the aqueous solution prepared in Comparative Experiment H, with 2.36 grams of CYMEL TM 325 to give a formulation containing 15 parts per hundred resin (phr) CYMEL TM 325. The coating is applied to 24 gauge×4 inches×12 inches (0 66 mm×101.6 mm×304.8 mm) unpolished clean-treated cold rolled steel panels with a No. 16 wire wound rod according to ASTM D 4147-82. The coated panels are baked in an oven at 400° F. (204.4° C.) for 10 minutes. The thickness of the coating is between 0.2 and 0.3 mils (0.00508 mm and 0.00762 mm).

COMPARATIVE EXPERIMENT J

Coatings are prepared by blending 52.3 grams of the aqueous dispersion prepared in Comparative Experiment H, with 3.65 grams CYMEL TM 325 to give a formulation containing 25 phr CYMEL TM 325. The coating is applied to 24 gauge×4 inches×12 inches (0.66 mm×101.6 mm×304.8 mm) unpolished clean-treated cold rolled steel panels with a No. 16 wire wound rod according to ASTM D 4147-82. The coating is baked in an oven at 400° F. (204.4° C.) for 10 minutes. The thickness of the coating is between 0.2 and 0.3 mils (0.00508 mm and 0.00762 mm).

EXAMPLE 23

A bisphenol A based epoxy resin having an epoxide equivalent weight of 932 (220.1 grams, 0.2362 equivalent) and 55.0 grams (0.465 mole) of 2-butoxyethanol are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 90° C. In a four ounce bottle is mixed 106.20 grams (5.9 moles) deionized water, 11.930 grams (0.0602 mole) 4,4'-trimethylenedipyridine, and 23.80 grams (0.2246 moles) of an aqueous solution of 85% lactic acid. This solution is then added dropwise over a period of 59 minutes while maintaining the reaction temperature at 90° C. The mixture is stirred at 90° C. for an additional seven hours. Then 592 grams deionized water is added to the pink reactor contents over a 22 minute period. The pink colored aqueous dispersion with a non-volatile content of 25 percent and charge density of 0.39 milliequivalent/gram resin is allowed to cool with stirring. The pH of the stable aqueous dispersion is 4.0. The viscosity which is measured with a Ford Cup No. 4 is 13.2 seconds. The volatile organic content of the dispersion is 1.6 pounds per gallon (192 grams/liter).

EXAMPLE 24

An aqueous solution of lactic acid (23.9 grams, 0.2255 mole) and 4,4'-trimethylenedipyridine (14.67 grams, 0.0740 mole) is reacted with a bisphenol A based epoxy resin having an epoxide equivalent weight of 932 (220.0 grams, 0.2360 equivalent) in ethylene glycol n-butyl ether (55.0 grams) according to the procedure in Example 23. The non-volatile content, volatile organic content, charge density, pH and viscosity of the red aqueous solution are 25 percent, 1.6 pounds per gallon (192 grams/liter), 0.58 milliequivalent/gram resin, 4.0 and 21.1 seconds, respectively.

EXAMPLE 25

An aqueous solution of lactic acid (23.79 grams, 0.2641 mole) and 4,4'-trimethylenedipyridine (17.578 grams, 0.0887 mole) is reacted with a bisphenol A based epoxy resin having an epoxide equivalent weight of 932 (220.0 grams, 0.2360 equivalent) in ethylene glycol n-butyl ether (55.0 grams) at 82° C. for five hours and 43 minutes according to the procedure in Example 23. The non-volatile content, volatile organic content, charge density, pH and viscosity of the pink aqueous solution are 25 percent, 1.6 pounds per gallon (192 grams/liter), 0.69 milliequivalent/gram resin, 4.5 and 39.9 seconds, respectively.

EXAMPLE 26

An aqueous solution of lactic acid (23.8 grams, 0.2246 mole) and 4,4'-trimethylenedipyridine (20.1 grams, 0.1014 mole) is reacted with a bisphenol A based epoxy resin having an epoxide equivalent weight of 932 (220.0 grams, 0.2360 equivalent) in ethylene glycol n-butyl ether (55 grams) at 90° C. for 5 hours and 95° C. for 2 hours according to the procedure in Example 23. The non-volatile content, volatile organic content, charge density, pH and viscosity of the burgundy aqueous solution are 25 percent, 1.6 pounds per gallon (192 grams/liter), 0.78 milliequivalent/gram resin, 4.4 and 45.3 seconds, respectively.

COMPARATIVE EXPERIMENT K

A bisphenol A based epoxy resin having an epoxide equivalent weight of 932 (220 grams, 0.2360 equivalent) and 55.0 grams of 2-butoxyethanol (0.465 mole) are added to a reactor of the type described in Example 1. The resin is slowly dissolved by heating to 125° C. Once the resin is dissolved, the nitrogen adapter is replaced with one having a four inch dip leg to obtain vigorous bubbling action below the surface. Then the resin is cooled to 90° C. In a eight ounce bottle is mixed 106.3 grams deionized water (5.9 moles), 14.866 grams nicotinamide (0.1217 mole), and 23.8 grams of an aqueous solution of 85% lactic acid (0.2246 mole). This solution is then added dropwise over a period of 75 minutes. The mixture is stirred at 92° C. for an additional 3 hours and twenty-one minutes. Then 430.3 grams deionized water is added to the yellow reactor contents over a 39 minutes period. The resulting reactor contents are allowed to cool with stirring. Deionized water (40.8 grams) is added to 203.3 grams of the yellow aqueous solution to give a solution having a non-volatile content of 25 percent and a charge density of 0.48 milliequivalent/gram resin. The pH of the stable aqueous solution is 4.1. The viscosity which is measured with a Ford Cup No. 4 is 12.4 seconds. The volatile organic content of the dispersion is 1.6 pounds per gallon (192 grams/liter).

COMPARATIVE EXPERIMENT L

An aqueous solution of lactic acid (23.7 grams, 0.2236 mole) and nicotinamide (21.6 grams, 0.1769 mole) is reacted with a bisphenol A based epoxy resin having an equivalent weight of 932 (219.7 grams, 0.2357 equivalents) in ethylene glycol n-butyl ether (55.0 grams) at 91° C. for 2 hours and 28 minutes according to the procedure in Comparative Experiment K. The nonvolatile content, volatile organic content, charge density, pH and viscosity of the yellow aqueous solution are 25 percent, 1.5 pounds per gallon (180 grams/liter), 0.68 milliequivalent/gram resin, 4.7 and 12.2 seconds, respectively.

COMPARATIVE EXPERIMENT M

An aqueous solution of lactic acid (23.8 grams, 0.2246 mole) and nicotinamide (25.3 grams, 0.2072 mole) is reacted with a bisphenol A based epoxy resin having an epoxide equivalent weight of 932 (220.0 grams, 0.2360 equivalent) in ethylene glycol n-butyl ether (55.0 grams) at 92° C. for 2 hours and thirty minutes according to the procedure in Comparative Experiment K. The nonvolatile content, volatile organic content, charge density, pH and viscosity of the yellow aqueous solution are 25 percent, 1.5 pounds per gallon (180 grams/liter), 0.78 milliequivalent/gram resin, 5.1 and 11.4 seconds, respectively.

The following Table I shows the results of tests performed on the coated panels of Examples 2, 4, 6, 8, 9, 11, 13 and 15 and Comparative Experiments B, C, D, F, G, I and J.

TABLE I

| BASE AQUEOUS DISPERSION | CYMEL TM 325 phr[c] | MEK[d] DR | T-BEND | REV. IMPACT[e] In.-Lb (J) |
|---|---|---|---|---|
| Ex.[a] 2 | 20 | 30 | T4 | 68 (7.684) |
| Ex. 4 | 10 | 80 | T5 | 60 (6.78) |

TABLE I-continued

| BASE AQUEOUS DISPERSION | CYMEL ™ 325 phr[c] | MEK[d] DR | T-BEND | REV. IMPACT[e] In.-Lb (J) |
|---|---|---|---|---|
| Ex. 6 | 20 | 40 | T4 | 84 (9.492) |
| Ex. 8 | 10 | 26 | T4 | 100 (11.3) |
| Ex. 9 | 15 | 50 | T4 | 80 (9.04) |
| Ex. 11 | 16 | 30 | T4 | 68 (7.684) |
| Ex. 13 | 15 | 35 | T4 | 84 (9.492) |
| Ex. 15 | 15 | 40 | T3 | 116 (13.108) |
| C.E.[b] B | 10 | 10 | T4 | 100 (11.3) |
| C.E. C | 15 | 15 | T7 | 72 (8.136) |
| C.E. D | 20 | 35 | T8 | 60 (6.78) |
| C.E. F | 15 | 8 | T3 | (108) |
| C.E. G | 25 | 30 | T8 | 60 (12.04) |
| C.E. I | 15 | 14 | T4 | 80 (9.04) |
| C.E. J | 25 | 55 | >T9 | 44 (4.972) |

Footnotes to Table I
[a]Example of the invention.
[b]Comparative Experiment, not an example of the invention.
[c]Parts per hundred parts of resin by weight.
[d]Resistance to methyl ethyl ketone expressed as double rubs.
[e]Reverse impact.

A coating having good chemical resistance and flexibility is characterized by having at least 25 MEK double rubs and a low T-bend. Examples 2 to 15 have at least 25 MEK double rubs and a T-bend of T3, T4 or T5. Therefore, the coatings of examples 2 to 15 have good chemical resistance and flexibility. The dispersions that are coated in examples 2 to 15 are prepared from bipyridines.

The coatings in Comparative Experiments B through J are inferior coatings because they do not have good chemical resistance and flexibility. For example, when they exhibit a T3 or T4 bend they have less than 25 MEK double rubs and when they exhibit 25 or more MEK double rubs, the T-bend is T8 or higher. The dispersions that are coated in Comparative Experiments B through J are prepared from monopyridines.

The following Tables II and III show the effect of varying the equivalents of a monopyridine vs. a dipyridine while maintaining the equivalents of lactic acid, water and bisphenol A based epoxy resin constant on the No. 4 Ford Cup viscosity of the aqueous dispersion or solution.

TABLE II

No. 4 FORD CUP VISCOSITY AS A FUNCTION OF 4,4'-TRIMETHYLENE-DIPYRIDINE (TEDP) CONCENTRATION

| Example | Equiv. of TEDP | No. 4 Ford Cup Viscosity seconds |
|---|---|---|
| 23 | 0.1204 | 13.2 |
| 24 | 0.1480 | 21.1 |
| 25 | 0.1774 | 39.9 |
| 26 | 0.2028 | 45.3 |

TABLE III

No. 4 FORD CUP VISCOSITY AS A FUNCTION OF NICOTINAMIDE CONCENTRATION

| Comparative Experiment | Equivalents of NICOTINAMIDE | No. 4 Ford Cup Viscosity seconds |
|---|---|---|
| K | 0.1217 | 12.4 |
| L | 0.1769 | 12.2 |
| M | 0.2072 | 11.4 |

Tables II and III illustrate that the viscosity increases with an increase in the concentration of a bipyridine such as 4,4'-trimethylenedipyridine (Table II) while the viscosity remains constant with an increase in the concentration of a monopyridine such as nicotinamide (Table III). An increase in viscosity is proportional to an increase in molecular weight.

What is claimed is:

1. A modified epoxy resin resulting from reacting
   (A) at least one epoxy resin selected from the group consisting of
      (1) at least one epoxy resin having an average of more than one vicinal epoxy group per molecule;
      (2) at least one epoxy resin having an average of more than one vicinal epoxy group per molecule wherein from about 1 to about 85 percent of the vicinal epoxy groups have been reacted with
         (a) at least one compound containing an aromatic hydroxyl group;
         (b) at least one compound containing a secondary amine group; or
         (c) any combination of (a) and (b); and
      (3) any combination of (1) and (2);
   (B) at least one pyridine-containing compound selected from the group consisting of
      (1) at least one compound containing more than one pyridine group per molecule; and
      (2) a mixture of pyridine-containing compounds comprising
         (a) at least one compound containing more than one pyridine group per molecule; and
         (b) at least one compound containing only one pyridine group per molecule: and
   (C) at least one Brönsted acid.

2. A modified epoxy resin composition of claim 1 wherein
   (i) component (A-1) is a diglycidyl ether of either of an aliphatic diol or an aromatic diol or: the product resulting from advancing such diglycidyl ether with an aromatic diol: a polyglycidyl ether of phenol- or halogen or alkyl substituted phenol-aldehyde novolac resin: or the polyglycidyl ether of the reaction product of a cycloalkyldiene and phenol or halogen or alkyl or oxyalkyl derivative of phenol;
   (ii) component (A-2-a) is an epoxy resin enumerated as component (A-1) which has been reacted with a compound represented by the following formula

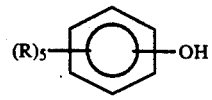

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms:

(iii) component (A-2-b) is an epoxy resin enumerated as component (A-1) which has been reacted with a compound represented by the following formulas

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) components (B-1 and B-2-a) are independently a compound represented by the following formulas

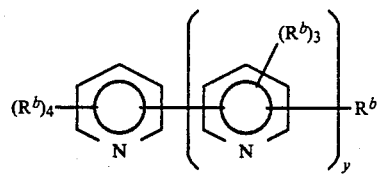

wherein $R^a$ is an alkyl group having from 1 to about 10 carbon atoms, an amine group, a urea group, a thiourea group, a carbonyl group, —S—S— group, —S—$CH_2$—$CH_2$—S— group, —C(OH)H—COgroup, or an amide group; each $R^b$ is independently selected from hydrogen, a halogen

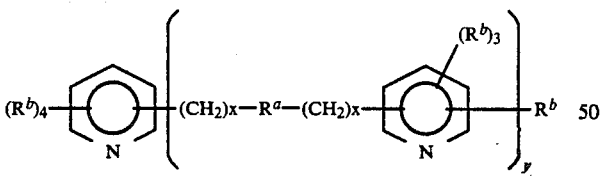

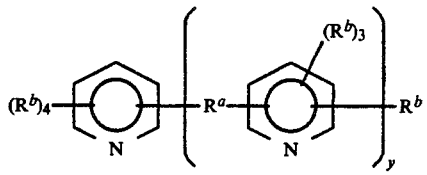

atom, a hydrocarbyl or hydrocarbyloxy or a hydroxyl substituted hydrocarbyl group having from 1 to about 10 carbon atoms, a carbamoyl group (—CO—$NH_2$), or a hydroxyl group; each x any 4 independently has a value from 1 to about 5;

(v) component (B-2-b) is a compound represented by the following formula

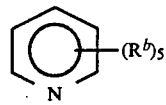

wherein each $R^b$ is independently selected from hydrogen, a halogen atom, a hydrocarbyl or hydrocarbyloxy or hydroxyl substituted hydrocarbyl group having from 1 to about 10 carbon atoms, a carbamoyl group (—CO—$NH_2$), or a hydroxyl group; and (vi) component (C) is an organic acid.

3. A modified epoxy resin composition of claim 2 wherein (i) component (A-1) is a diglycidyl ether of bisphenol A which has been advanced with bisphenol A to an epoxide equivalent weight of from about 500 to about 2000:

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof:

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;

(iv) components (B-1) and (B-2-a) are independently 4,4'-trimethylenedipyridine, 1,2-bis(4-pyridyl)ethane, 3,3'-bipyridine, 1,3-di-(picolyl)thiourea, or any combination thereof:

(v) component (B-2-b) is pyridine, 3-picoline, 4-picoline or nicotinamide: and (vi) component (C) is lactic acid, acetic acid, or any combination thereof.

4. A curable non-aqueous composition comprising
(1) a modified epoxy resin resulting from reacting;
   (A) at least one epoxy resin selected from the group consisting of
      (1) at least one epoxy resin having an average of more than one vicinal epoxy group per molecule:
      (2) at least one epoxy resin having an average of more than one vicinal epoxy group per molecule wherein from about 1 to about 85 percent of the vicinal epoxy groups have been reacted with
         (a) at least one compound containing an aromatic hydroxyl group:
         (b) at least one compound containing a secondary amine group; and
         (c) any combination of (a) and (b): and
      (3) any combination of (1) and (2);
   (B) at least one pyridine-containing compound;
   (C) at least one Brönsted acid; and
(II) a curing amount of at least one curing agent.

5. A curable non-aqueous composition of claim 4 wherein (i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin enumerated as component (A-1) which has been reacted with a compound represented by the following formula

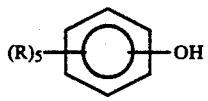

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a halogen atom, a nitro group, an alkyl or alkoxy group having from 1 to about 20 carbon atoms;

(iii) component (A-2-b) is an epoxy resin enumerated as component (A-1) which has been reacted with a compound represented by the following formulas

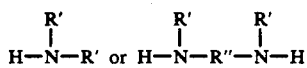

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) component (B) is independently a compound represented by the following formulas

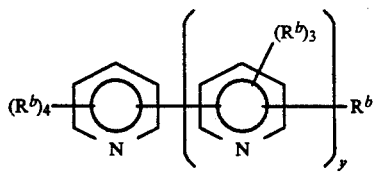

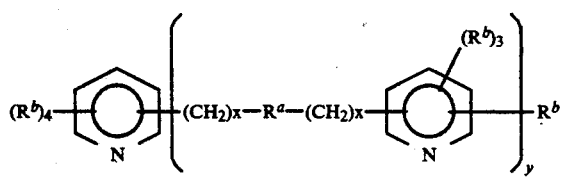

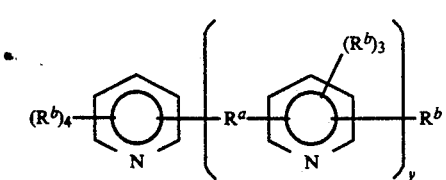

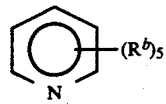

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group, —C(OH)H—CO— group, or an amide group: each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;

(v) component (C) is an organic acid; and (vi) component (II) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

6. A curable non-aqueous composition of claim 5 wherein (i) component (A-1) is a diglycidyl ether of bisphenol A which has been advanced with bisphenol A to an epoxide equivalent weight of from about 500 to about 2000:

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;

(iv) component (B) is independently 4,4'-trimethylenedipyridine, 1,2-bis(4-pyridyl)ethane, 3,3'-bipyridine, 1,3-di(picolyl)thiourea, pyridine, 3-picoline, 4-picoline, nicotinamide, or any combination thereof;

(v) component (C) is lactic acid, acetic acid, or any combination thereof: and (vi) component (II) is highly methylated melamine-formaldehyde resin, a mixture of the allyl ethers of mono-, di- and tri-methylol phenols, or any combination thereof.

7. An aqueous composition having dissolved or dispersed in water a composition comprising a modified epoxy resin resulting from reacting (A) at least one epoxy resin selected from the group consisting of (1) at least one epoxy resin having an average of more than one vicinal epoxy group per molecule;

(2) at least one epoxy resin having an average of more than one vicinal epoxy group per molecule wherein from about 1 to about 85 percent of the vicinal epoxy groups have been reacted with (a) at least one compound containing an aromatic hydroxyl group; or
(b) at least one compound containing a secondary amine group; or
(c) any combination of (a) and (b); and
(3) any combination of (1) and (2);
(B) at least one pyridine-containing compound selected from
(1) at least one compound containing more than one pyridine group per molecule; and
(2) a mixture of pyridine-containing compounds comprising
(a) at least one compound containing more than one pyridine group per molecule; and
(b) at least one compound containing only one pyridine group per molecule; and
(C) at least one Brönsted acid.

8. An aqueous composition of claim 7 wherein
(i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;
(ii) component (A-2-a) is an epoxy resin enumerated as component (A-1) which has been reacted with a compound represented by the following formula

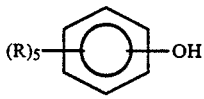

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;
(iii) component (A-2-b) is an epoxy resin enumerated as component (A-1) which has been reacted with a compound represented by the following formulas

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;
(iv) components (B-1 and B-2-a) are independently a compound represented by the following formulas

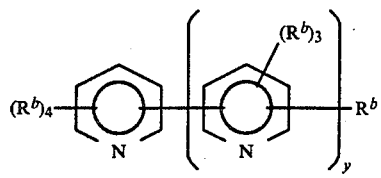
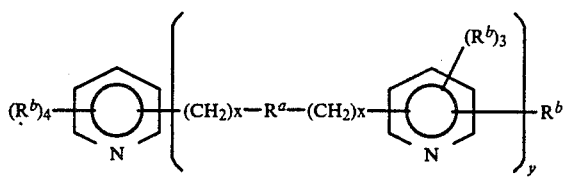
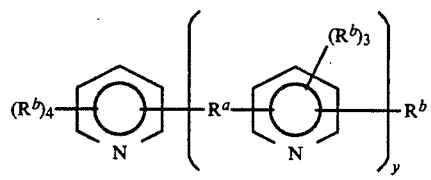

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group, —C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;
(v) component (B-2-b) is a compound represented by the following formula

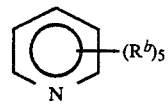

wherein each $R^b$ is independently selected from hydrogen, a halogen atom, a hydrocarbyl or hydrocarbyloxy or hydroxyl substituted hydrocarbyl group having from 1 to about 10 carbon atoms, a carbamoyl group (—CO—NH$_2$), or a hydroxyl group: and
(vi) component (C) is an organic acid.

9. An aqueous composition of claim 8 wherein
(i) component (A-1) is a diglycidyl ether of bisphenol A which has been advanced with bisphenol A to an epoxide equivalent weight of from about 500 to about 2000:
(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof:
(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;

(iv) components (B-1) and (B-2-a) are independently 4,4'-trimethylenedipyridine, 1,2-bis(4-pyridyl)ethane, 3,3'-bipyridine, 1,3-di(picolyl)thiourea, or any combination thereof;

(v) component (B-2-b) is pyridine, 3-picoline, 4-picoline, nicotinamide; and (vi) component (C) is lactic acid, acetic acid, or any combination thereof.

10. A curable aqueous composition having dissolved or dispersed in water a composition comprising
(I) a modified epoxy resin resulting from reacting a composition comprising
  (A) at least one epoxy resin selected from the group consisting of
    (1) at least one epoxy resin having an average of more than one vicinal epoxy group per molecule;
    (2) at least one epoxy resin having an average of more than one vicinal epoxy group per molecule wherein from about 1 to about 85 percent of the vicinal epoxy groups have been reacted with
      (a) at least one compound containing an aromatic hydroxyl group:
      (b) at least one compound containing a secondary amine group; or
      (c) any combination of (a) and (b); and
    (3) any combination of (1) and (2);
  (B) at least one pyridine-containing compound selected from
    (1) at least one compound containing more than one pyridine group per molecule; and
    (2) a mixture of pyridine-containing compounds comprising
      (a) at least one compound containing more than one pyridine group per molecule; and
      (b) at least one compound containing only one pyridine group per molecule;
  (C) at least one Brönsted acid; and
(II) a curing amount of at least one curing agent.

11. A curable aqueous composition of claim 10 wherein
(i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin enumerated as component (A-1) which has been reacted with a compound represented by the following formula

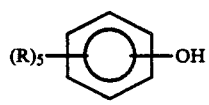

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;

(iii) component (A-2-b) is an epoxy resin enumerated as component (A-1) which has been reacted with a compound represented by the following formulas

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) components (B-1 and B-2-a) are independently a compound represented by the following formulas

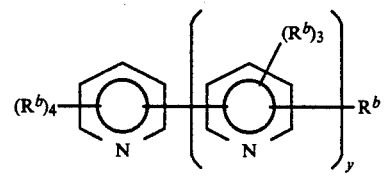

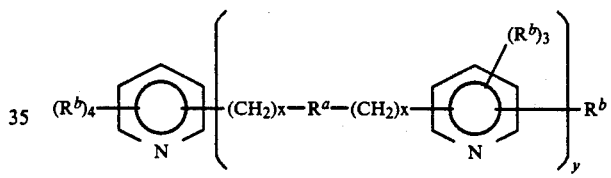

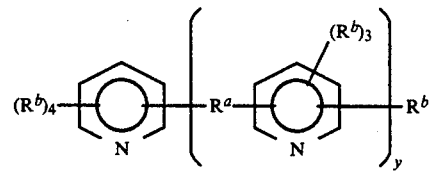

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group, —C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;

(v) component (B-2-b) is a compound represented by the following formula

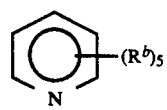

wherein each $R^b$ is independently selected from hydrogen, a halogen atom, a hydrocarbyl or hydrocarbyloxy or hydroxyl substituted hydrocarbyl group having from 1 to about 10 carbon atoms, a carbamoyl group (—CO—NH$_2$), or a hydroxyl group;

(vi) component (C) is an organic acid; and (vii) component (II) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

12. A curable aqueous composition of claim 11 wherein (i) component (A-1) is a diglycidyl ether of bisphenol A which has been advanced with bisphenol A to an epoxide equivalent weight of from about 500 to about 2000:

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine or any combination thereof;

(iv) components (B-1) and (B-2-a) are independently 4,4'-trimethylenedipyridine, 1,2-bis(4pyridyl)ethane, 3,3'-bipyridine, 1,3-di(picolyl)thiourea, or any combination thereof;

(v) component (B-2-b) is pyridine, 3-picoline, 4-picoline, nicotinamide:

(vi) component (C) is lactic acid, acetic acid, or any combination thereof; and (vii) component (II) is highly methylated melamine-formaldehyde resin, or any combination thereof.

13. A non-aqueous coating composition comprising a curable non-aqueous composition and one or more additives, said curable non-aqueous composition comprising (I) a modified epoxy resin resulting from reacting;
 (A) at least one epoxy resin selected from the group consisting of
  (1) at least one epoxy resin having an average of more than one vicinal epoxy group per molecule;
  (2) at least one epoxy resin having an average of more than one vicinal epoxy group per molecule wherein from about 1 to about 85 percent of the vicinal epoxy groups have been reacted with
   (a) at least one compound containing an aromatic hydroxyl group;
   (b) at least one compound containing a secondary amine group; and
   (c) any combination of (a) and (b); and
  (3) any combination of (1) and (2);
 (B) at least one pyridine-containing compound;
 (C) at least one Brönsted acid; and
(II) a curing amount of at least one curing agent.

14. A non-aqueous coating composition of claim 13 wherein (i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin enumerated as component (A-1) which has been reacted with a compound represented by the following formula $$(R)_5 \!-\!\!\bigcirc\!\!-\! OH$$

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a halogen atom, a nitro group, an alkyl or alkoxy group having from 1 to about 20 carbon atoms;

(iii) component (A-2-b) is an epoxy resin enumerated as component (A-1) which has been reacted with a compound represented by the following formulas $$\begin{matrix} R' & & R' & R' \\ | & & | & | \\ H\!-\!N\!-\!R' & \text{or} & H\!-\!N\!-\!R''\!-\!N\!-\!H \end{matrix}$$

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) component (B) is independently a compound represented by the following formulas -continued

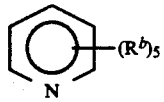

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group, —C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x 4 independently has a value from 1 to about 5;

(v) component (C) is an organic acid; and (vi) component (II) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof 15. A non-aqueous coating composition of claim 14 wherein (i) component (A-1) is a diglycidyl ether of bisphenol A which has been advanced with bisphenol A to an epoxide equivalent weight of from about 500 to about 2000;

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;

(iv) component (B) is independently 4,4'-trimethylenedipyridine, 1,2-bis(4pyridyl)ethane, 3,3'-bipyridine, 1,3-di(picolyl)thiourea, pyridine, 3-picoline, 4-picoline, nicotinamide, or any combination thereof;

(v) component (C) is lactic acid, acetic acid, or any combination thereof; and (vi) component (II) is highly methylated melamine-formaldehyde resin, a mixture of the allyl ethers of mono-, di-, and tri-methylol phenols, or any combination thereof.

16. An aqueous coating composition comprising a curable aqueous composition and one or more additives, said curable aqueous composition being an aqueous dispersion or solution of a composition comprising (I) a modified epoxy resin resulting from reacting a composition comprising (A) at least one epoxy resin selected from the group consisting of (1) at least one epoxy resin having an average of more than one vicinal epoxy group per molecule;

(2) at least one epoxy resin having an average of more than one vicinal epoxy group per molecule wherein from about 1 to about 85 percent of the vicinal epoxy groups have been reacted with (a) at least one compound containing an aromatic hydroxyl group;

(b) at least one compound containing a secondary amine group; or (c) any combination of (a) and (b); and (3) any combination of (1) and (2);

(B) at least one pyridine-containing compound selected from (1) at least one compound containing more than one pyridine group per molecule; and (2) a mixture of pyridine-containing compounds comprising (a) at least one compound containing more than one pyridine group per molecule; and (b) at least one compound containing only one pyridine group per molecule;

(C) at least one Brönsted acid; and (II) a curing amount of at least one curing agent.

17. An aqueous coating composition of claim 16 wherein (i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin enumerated as component (A-1) which has been reacted with a compound represented by the following formula

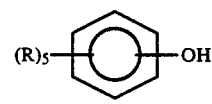

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;

(iii) component (A-2-b) is an epoxy resin enumerated as component (A-1) which has been reacted with a compound represented by the following formulas

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) components (B-1 and B-2-a) are independently a compound represented by the following formulas

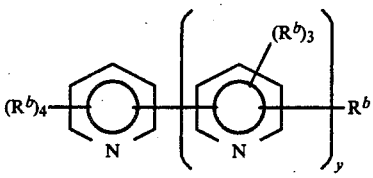

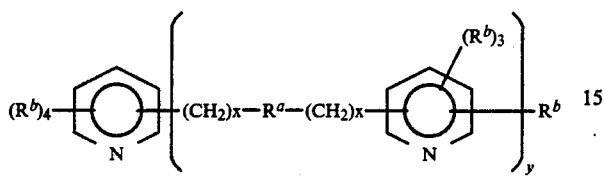

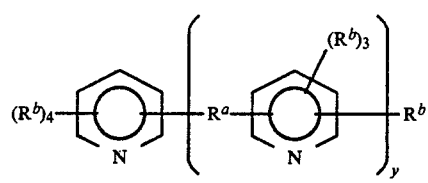

wherein $R^a$ is an alkyl group having from 1 to about 10 carbon atoms, an amine group, a urea group, a thiourea group, a carbonyl group, —S— group, —S—S—group, —S—CH$_2$—CH$_2$—S— group, —C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;

(v) component (B-2-b) is a compound represented by the following formula

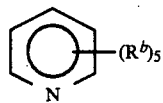

wherein each $R^b$ is independently selected from hydrogen, a halogen atom, a hydrocarbyl or hydrocarbyloxy or hydroxyl substituted hydrocarbyl group having from 1 to about 10 carbon atoms, a carbamoyl group (—CO—NH$_2$), or a hydroxyl group;

(vi) component (C) is an organic acid; and (vii) component (II) is urea-aldehyde resin, alkylated urea aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

18. An aqueous coating composition of claim 17 wherein (i) component (A-1) is a diglycidyl ether of bisphenol A which has been advanced with bisphenol A to an epoxide equivalent weight of from about 500 to about 2000;

(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof;

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine or any combination thereof;

(iv) components (B-1) and (B-2-a) are independently 4,4'-trimethylenedipyridine, 1,2-bis(4-pyridyl)ethane, 3,3'-bipyridine, 1,3-di(picolyl)thiourea, or any combination thereof;

(v) component (B-2-b) is pyridine, 3-picoline, 4-picoline, nicotinamide;

(vi) component (C) is lactic acid, acetic acid, or any combination thereof; and (vii) component (II) is highly methylated melamine-formaldehyde resin, or any combination thereof.

19. An article coated with a non-aqueous coating composition of claim 13 which composition has been cured subsequent to being applied to said article.

20. An article coated with a non-aqueous coating composition of claim 14 which composition has been cured subsequent to being applied to said article.

21. An article coated with a non-aqueous coating composition of claim 15 which composition has been cured subsequent to being applied to said article.

22. An article coated with an aqueous coating composition of claim 16 which composition has been cured subsequent to being applied to said article.

23. An article coated with an aqueous coating composition of claim 17 which composition has been cured subsequent to being applied to said article.

24. An article coated with an aqueous coating composition of claim 18 which composition has been cured subsequent to being applied to said article.

25. A product resulting from curing a curable non-aqueous composition comprising (I) a modified epoxy resin resulting from reacting;
  (A) at least one epoxy resin selected from the group consisting of
    (1) at least one epoxy resin having an average of more than one vicinal epoxy group per molecule;
    (2) at least one epoxy resin having an average of more than one vicinal epoxy group per molecule wherein from about 1 to about 85 percent of the vicinal epoxy groups have been reacted with
      (a) at least one compound containing an aromatic hydroxyl group;
      (b) at least one compound containing a secondary amine group; and
      (c) any combination of (a) and (b): and
    (3) any combination of (1) and (2);
  (B) at least one pyridine-containing compound;
  (C) at least one Brönsted acid; and
(II) a curing amount of at least one curing agent.

26. A product of claim 25 wherein (i) component (A-1) is a diglyoidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;

(ii) component (A-2-a) is an epoxy resin enumerated as component (A-1) which has been reacted with a compound represented by the following formula

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;

(iii) component (A-2-b) is an epoxy resin enumerated as component (A-1) which has been reacted with a compound represented by the following formulas

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;

(iv) component (B) is independently a compound represented by the following formulas

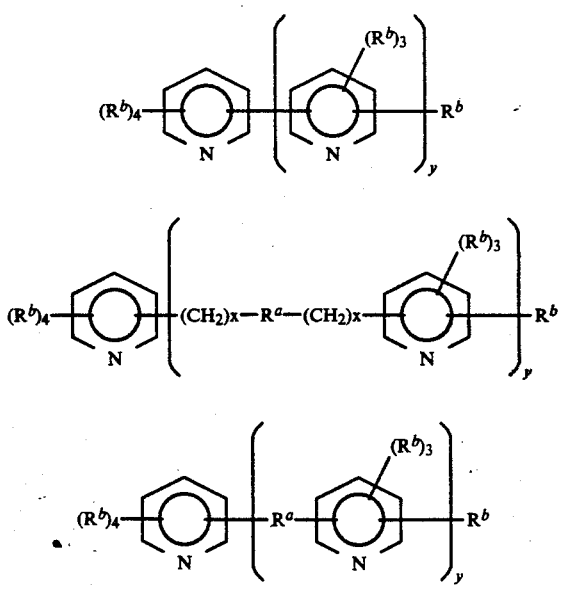

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group,

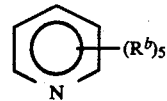

—C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;

(v) component (C) is an organic acid: and (vi) component (II) is urea-aldehyde resin, alkylated urea-aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

27. A product of claim 26 wherein
(i) component (A-1) is a diglycidyl ether of bisphenol A which has been advanced with bisphenol A to an epoxide equivalent weight of from about 500 to about 2000;
(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n-propylphenol, 4-tertbutylphenol, or any combination thereof;
(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine, or any combination thereof;
(iv) component (B) is independently 4,4'-trimethylenedipyridine, 1,2-bis(4-pyridyl)ethane, 3,3'-bipyridine, 1,3-di(picolyl)thiourea, pyridine, 3-picoline, 4-picoline, nicotinamide, or any combination thereof;
(v) component (C) is lactic acid, acetic acid, or any combination thereof; and
(vi) component (II) is highly methylated melamine-formaldehyde resin, a mixture of the allyl ethers of mono-, di-, and tri-methylol phenols, or any combination thereof.

28. A product resulting from curing a curable aqueous composition having dissolved or dispersed in water a composition comprising
(I) a modified epoxy resin resulting from reacting a composition comprising
(A) at least one epoxy resin selected from the group consisting of
(1) at least one epoxy resin having an average of more than one vicinal epoxy group per molecule;
(2) at least one epoxy resin having an average of more than one vicinal epoxy group per molecule wherein from about 1 to about 85 percent of the vicinal epoxy groups have been reacted with (a) at least one compound containing an aromatic hydroxyl group;
(b) at least one compound containing a secondary amine group; or
(c) any combination of (a) and (b); and
(3) any combination of (1) and (2);
(B) at least one pyridine-containing compound selected from
(1) at least one compound containing more than one pyridine group per molecule; and
(2) a mixture of pyridine-containing compounds comprising
(a) at least one compound containing more than one pyridine group per molecule; and
(b) at least one compound containing only one pyridine group per molecule;
(C) at least one Brönsted acid; and
(II) a curing amount of at least one curing agent.

29. A product of claim 28 wherein
(i) component (A-1) is a diglycidyl ether of either of an aliphatic diol or an aromatic diol or; the product resulting from advancing such diglycidyl ether with an aromatic diol; a polyglycidyl ether of phenol- or halogen or alkyl substituted phenol-aldehyde novolac resin; or the polyglycidyl ether of the reaction product of a cycloalkyldiene and phenol or halogen or alkyl or oxyalkyl derivative of phenol;
(ii) component (A-2-a) is an epoxy resin enumerated as component (A-1) which has been reacted with a compound represented by the following formula

wherein each R is independently hydrogen, a halogen, particularly chlorine or bromine, a hydrocarbyl or hydrocarbyloxy group having from 1 to about 20 carbon atoms and which hydrocarbyl or hydrocarbyloxy groups can contain substitutent groups such as a nitro group, an alkyl or alkoxy group having from 1 to about 20 carbon atoms;
(iii) component (A-2-b) is an epoxy resin enumerated as component (A-1) which has been reacted with a compound represented by the following formulas

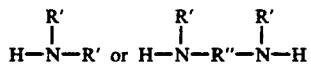

wherein each R' is independently a hydrocarbyl group having from 1 to about 20 carbon atoms, which hydrocarbyl groups can be substituted with a nitro group, a hydroxyl group, or an alkyl group having from 1 to about 10 carbon atoms; and R" is a divalent hydrocarbyl group or a divalent hydrocarbyl group substituted with a nitro group, a hydroxyl group, or an alkyl group having from 1 to about 10 carbon atoms;
(iv) components (B-1 and B-2-a) are independently a compound represented by the following formulas

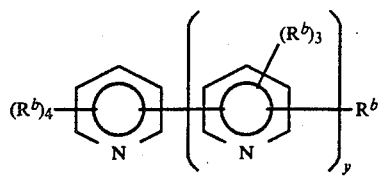

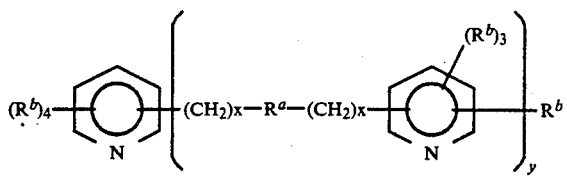

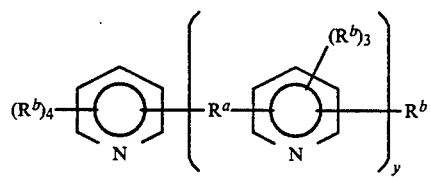

wherein $R^a$ is an alkyl group having from 1 to about 10 carbon atoms, an amine group, a urea group, a thiourea group, a carbonyl group, —S— group, —S—S— group, —S—CH$_2$—CH$_2$—S— group, —C(OH)H—CO— group, or an amide group; each $R^b$ is independently selected from hydrogen, a halogen atom, a hydrocarbyl or hydrocarbyloxy or a hydroxyl substituted hydrocarbyl group having from 1 to about 10 carbon atoms, a carbamoyl group (—CO—NH$_2$), or a hydroxyl group; each x any 4 independently has a value from 1 to about 5;
(v) component (B-2-b) is a compound represented by the following formula

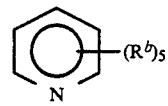

wherein each $R^b$ is independently selected from hydrogen, a halogen atom, a hydrocarbyl or hydrocarbyloxy or hydroxyl substituted hydrocarbyl group having from 1 to about 10 carbon atoms, a carbamoyl group (—CO—NH$_2$), or a hydroxyl group;
(vi) component (C) is an organic acid; and
(vii) component (II) is urea-aldehyde resin, alkylated urea aldehyde resin, melaminealdehyde resin, alkylated melamine-aldehyde resin, phenol-aldehyde resin, alkylated phenolaldehyde resin, monoalcohol blocked prepolymer of an isocyanate and a polyol, or any combination thereof.

30. A product of claim 29 wherein
(i) component (A-1) is a diglycidyl ether of bisphenol A which has been advanced with bisphenol A to an epoxide equivalent weight of from about 500 to about 2000;
(ii) component (A-2-a) is the product resulting from advancing a diglycidyl ether of bisphenol A with bisphenol A to an epoxide equivalent weight of from about 500 to about 2000, which product has been reacted with phenol, nonylphenol, 4-n- propylphenol, 4-tertbutylphenol, or any combination thereof:

(iii) component (A-2-b) is the product resulting from advancing a diglycidyl ether of bisphenol A with bisphenol A to an epoxide equivalent weight of from about 500 to about 2000, which product has been reacted with diethanolamine, methylethanolamine, ethylethanolamine, dibutylamine or any combination thereof;

(iv) components (B-1) and (B-2-a) are independently 4,4'-trimethylenedipyridine, 1,2-bis(4-pyridyl)ethane, 3,3'-bipyridine, 1,3-di(picolyl)thiourea, or any combination thereof;

(v) component (B-2-b) is pyridine, 3-picoline, 4-picoline, nicotinamide;

(vi) component (C) is lactic acid, acetic acid, or any combination thereof; and (vii) component (II) is highly methylated melamine-formaldehyde resin, or any combination thereof.

* * * * *

UNITED STATES PATENT AND TRADEMARK OFFICE
CERTIFICATE OF CORRECTION

PATENT NO. : 5,021,471

DATED : June 4, 1991

INVENTOR(S) : Duane S. Treybig

It is certified that error appears in the above-identified patent and that said Letters Patent is hereby corrected as shown below:

Col. 26, line 46, change the colon to a semicolon.

Col. 27, line 7, change the colon to a semicolon.

Col. 27, line 43, change "-COgroup" to -- -CO-group --.

Col. 27, line 65, change "any 4" to --and y--.

Col. 28, line 20, change the colon to a semicolon.

Col. 28, line 27, change the colon to a semicolon.

Col. 28, line 38, change the colon to a semicolon.

Col. 28, line 49, change the colon to a semicolon.

Col. 28, line 56, change the colon to a semicolon.

Col. 28, line 59, change the colon to a semicolon.

Col. 30, line 13, change the colon to a semicolon.

Col. 30, line 18, change "any 4" to --and y--.

Col. 30, line 22, change "melaminealdehyde" to --melamine-aldehyde--.

Col. 30, line 32, change the colon to a semicolon.

Col. 30, line 53, change the colon to a semicolon.

Col. 32, line 35, change "any 4" to --and y--.

Col. 32, line 51, change the colon to a semicolon.

Col. 32, line 57, change the colon to a semicolon.

Col. 32, line 64, change the colon to a semicolon.

Col. 33, line 27, change the colon to a semicolon.

UNITED STATES PATENT AND TRADEMARK OFFICE
CERTIFICATE OF CORRECTION

PATENT NO. : 5,021,471

DATED : June 4, 1991

INVENTOR(S) : Duane S. Treybig

It is certified that error appears in the above-identified patent and that said Letters Patent is hereby corrected as shown below:

Col. 34, line 56, change "any 4" to read --and y'--.

Col. 35, line 17, change the colon to a semicolon.

Col. 35, line 33, change "1,2-bis(4pyridyl)" to --1,2-bis(4-pyridyl)--.

Col. 35, line 37, change the colon to a semicolon.

Col 37, line 18, change "each x 4" to --each x and y--.

Col. 37, line 22, change "melaminealdehyde" to --melamine-aldehyde--.

Col. 37, line 26, change "thereof" to read --thereof.--.

Col. 37, line 48, change "(4pyridyl) to --(4-pyridyl)--.

Col. 39, line 37, change "any 4" to --and y--.

Col. 39, line 55, change "melaminealdehyde" to --melamine-aldehyde--.

Col. 39, line 57, change "phenolaldehyde" to --phenol-aldehyde --.

UNITED STATES PATENT AND TRADEMARK OFFICE
CERTIFICATE OF CORRECTION

PATENT NO. : 5,021,471

DATED : June 4, 1991

INVENTOR(S) : Duane S. Treybig

It is certified that error appears in the above-identified patent and that said Letters Patent is hereby corrected as shown below:

Col. 40, line 64, change "diglyoidyl" to --diglycidyl--

Col. 42, line 15, change "any4" to --and y--.

Col. 42, line 16, change the colon to a semicolon

Col. 42, line 19, change "melaminealdehyde" to --melamine-aldehyde--.

Col. 44, line 35, change "any4" to --and y--

Col. 44, line 54, change "melaminealdehyde" to --melamine-aldehyde--.

Col. 44, line 56, change "phenolaldehyde" to --phenol-aldehyde--.

Signed and Sealed this

Twenty-second Day of June, 1993

*Attest:*

MICHAEL K. KIRK

*Attesting Officer*         *Acting Commissioner of Patents and Trademarks*